United States Patent
Zhou et al.

(10) Patent No.: US 11,461,876 B2
(45) Date of Patent: Oct. 4, 2022

(54) VIDEO DATA PROCESSING METHOD AND APPARATUS, AND STORAGE MEDIUM

(71) Applicant: Tencent Technology (Shenzhen) Company Limited, Shenzhen (CN)

(72) Inventors: Jingjin Zhou, Shenzhen (CN); Pei Cheng, Shenzhen (CN); Yirong Zeng, Shenzhen (CN); Bin Fu, Shenzhen (CN); Yu Gao, Shenzhen (CN); Xiaolong Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 126 days.

(21) Appl. No.: 16/993,061

(22) Filed: Aug. 13, 2020

(65) Prior Publication Data

US 2020/0372613 A1 Nov. 26, 2020

Related U.S. Application Data

(63) Continuation of application No. PCT/CN2019/091340, filed on Jun. 14, 2019.

(30) Foreign Application Priority Data

Jul. 4, 2018 (CN) .......................... 201810721857.0

(51) Int. Cl.
  *G06V 40/20* (2022.01)
  *G06T 5/00* (2006.01)
(52) U.S. Cl.
  CPC .............. *G06T 5/002* (2013.01); *G06V 40/23* (2022.01); *G06T 2207/10016* (2013.01); *G06T 2207/20182* (2013.01); *G06T 2207/30196* (2013.01)

(58) Field of Classification Search
None
See application file for complete search history.

(56) References Cited

U.S. PATENT DOCUMENTS

2009/0252423 A1* 10/2009 Zhu ...................... G06V 40/103
                                                                382/209
2015/0185828 A1    7/2015 Wu

FOREIGN PATENT DOCUMENTS

CN         105516589 A     4/2016
CN         107335192 A    11/2017
(Continued)

OTHER PUBLICATIONS

Lo, "Chinese company develops controversial video app that gives women longer legs and larger breasts", Daily mail.com, https://www.dailymail.co.uk/news/article-5674897/Chinese-company-develops-video-app-turn-users-supermodels-using-augmented-reality.html, May 1, 2018 (Year: 2018).*

(Continued)

*Primary Examiner* — Randolph I Chu
(74) *Attorney, Agent, or Firm* — Morgan, Lewis & Bockius LLP

(57) ABSTRACT

Embodiments of this application disclose a video data processing method and apparatus, and a storage medium. After historical and current video frames are acquired from a video stream, two point position sets of a human body are obtained from the historical video frame and the current video frame, respectively. A jitter amplitude of a human body key point in the current video frame is analyzed according to the point position set of the human body in the current video frame and the point position set of the human body in the historical video frame; an adjustment reference position of the human body in the current video frame is determined according to the jitter amplitude; and subsequently a human body part below the adjustment reference (Continued)

position in the current video frame is adjusted and the adjusted current video frame is outputted for display as part of the video stream.

20 Claims, 16 Drawing Sheets

(56) References Cited

FOREIGN PATENT DOCUMENTS

| | | | |
|---|---|---|---|
| CN | 107704829 A | | 2/2018 |
| CN | 107734207 A | | 2/2018 |
| CN | 107967693 | * | 4/2018 |
| CN | 107967693 A | | 4/2018 |
| CN | 108898118 A | | 11/2018 |

OTHER PUBLICATIONS

Tencent Technology, ISR, PCT/CN2019/091340, Jul. 26, 2019, 3 pgs.
Tencent Technology, WO, PCT/CN2019/091340, Jul. 26, 2019, 4 pgs.
Tencent Technology, IPRP, PCT/CN2019/091340, Jan. 5, 2021, 5 pgs.

* cited by examiner

105

1051
Use a preset waist line value as the waist line position of the current video frame in a case that it is determined according to the jitter amplitude that the current video frame is in a steady state

1052
Calculate the waist line position of the current video frame according to the point position set of the human body in the current video frame in a case that it is determined according to the jitter amplitude that the current video frame is in an unsteady state

FIG. 1g

VIDEO DATA PROCESSING METHOD AND APPARATUS, AND STORAGE MEDIUM

CROSS REFERENCE TO RELATED APPLICATIONS

This application is a continuation application of PCT Patent Application No. PCT/CN2019/091340, entitled "METHOD AND DEVICE FOR VIDEO DATA PROCESSING AND STORAGE MEDIUM" filed on Jun. 14, 2019, which claims priority to Chinese Patent Application No. 201810721857.0, entitled "VIDEO DATA PROCESSING METHOD AND APPARATUS, AND STORAGE MEDIUM" filed Jul. 4, 2018, all of which are incorporated by reference in their entirety.

FIELD OF THE TECHNOLOGY

This application relates to the field of communications technologies, and specifically, to a video data processing method and apparatus, and a storage medium.

BACKGROUND OF THE DISCLOSURE

With the development of network technologies and the popularization of mobile terminals, video shooting has gradually become a manner in which many users perform social sharing and communication. Meanwhile, many technologies used for beautifying a video image are also generated. For example, whitening, dermabrasion, or face thinning may be performed on a human face in a video. Certainly, in addition to the human face, a human body in the video may also be beautified. For example, the legs may be stretched (leg-lengthening for short), and the like.

In the video, a change range of the human body posture is usually relatively large. Therefore, when the human body in the video is adjusted, offline manual adjustment usually needs to be performed on each frame of image, leading to both relatively low processing efficiency and a failure to meet the requirement of real-time playback (such as video chat or live broadcast).

SUMMARY

Embodiments of this application provide a video data processing method and apparatus, and a storage medium, to enhance the robustness and adaptability of video data processing and improve the effect of video data processing, thereby improving the display effect of a video image.

An embodiment of this application provides a video data processing method, performed by a computing device having a processor and memory storing a plurality of computer programs to be executed by the processor, the method comprising:

acquiring a current video frame and a historical video frame from a video stream, the historical video frame being a video frame within a preset time range before the current video frame in the video stream;

obtaining a point position set of a human body in the current video frame;

obtaining a point position set of the human body in the historical video frame;

analyzing a jitter amplitude of a human body key point in the current video frame according to the point position set of the human body in the current video frame and the point position set of the human body in the historical video frame;

determining an adjustment reference position of the human body in the current video frame according to the jitter amplitude; and adjusting a human body part below the adjustment reference position in the current video frame and outputting the adjusted current video frame.

An embodiment of this application further provides a computing device, including:

a processor; and memory connected to the processor, the memory storing a plurality of computer programs that, when executed by the processor, cause the computing device to perform the operations in any video data processing method according to the embodiments of this application.

In addition, an embodiment of this application further provides a non-transitory computer-readable storage medium storing a plurality of computer programs that, when executed by a processor of a computing device, cause the computing device to perform the operations in any video data processing method according to the embodiments of this application.

In the embodiments of this application, after the current video frame is acquired, the position of the human body key point in the current video frame may be detected, to obtain the point position set of the human body in the current video frame. Then the point position set of the human body in the historical video frame is obtained, and the jitter amplitude of the human body key point in the current video frame is analyzed according to the point position set of the human body in the current video frame and the point position set of the human body in the historical video frame. The adjustment reference position of the human body in the current video frame is determined according to the jitter amplitude. Subsequently, the human body part corresponding to the adjustment reference position in the current video frame is adjusted, and the adjusted current video frame is outputted, thereby performing real-time adjustment on the human body in the current frame. In this solution, only the human body part corresponding to the adjustment reference position is adjusted, and the adjustment reference position may be flexibly determined according to the jitter amplitude. Therefore, the human body in the video frame can be adjusted in real time, to improve an adjustment effect; meanwhile, natural and smooth background deformation in the video frame is ensured to a large extent, thereby greatly improving the robustness and adaptability of a real-time adjustment function and helping to improve the display effect of the video image.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 1g is a flowchart of determining an adjustment reference position of a human body in a current video frame according to a jitter amplitude according to some embodiments of this application.

DESCRIPTION OF EMBODIMENTS

To make the objectives, technical solutions, and advantages of this application clearer, the following further describes this application in detail with reference to the accompanying drawings.

The following clearly and completely describes the technical solutions in the embodiments of this application with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

In some solutions of adjusting a human body in a video, after the video data is obtained, an overall adjustment is performed on each frame of image in the video data. For example, in the "real-time leg-lengthening" solution, after video data is obtained, overall longitudinal stretching is performed on each frame of image in the video data. Although performing overall longitudinal stretching on each frame of image can achieve the "leg-lengthening" effect to some extent, actually it may also cause other objects in the image to deform greatly, greatly affecting the display effect of the video. In addition, because a change range of the human body posture is usually relatively large (such as dancing), there may be cases such as inconsistent "leg-lengthening" effects in different frames and a relatively large jitter amplitude of the background. That is, the robustness and adaptability of these solutions are relatively poor, and adjustment effects are not good, which is not conducive to improving the display effect of the video image.

Some embodiments of this application provide a video data processing method and apparatus, and a storage medium.

Figure 1A:
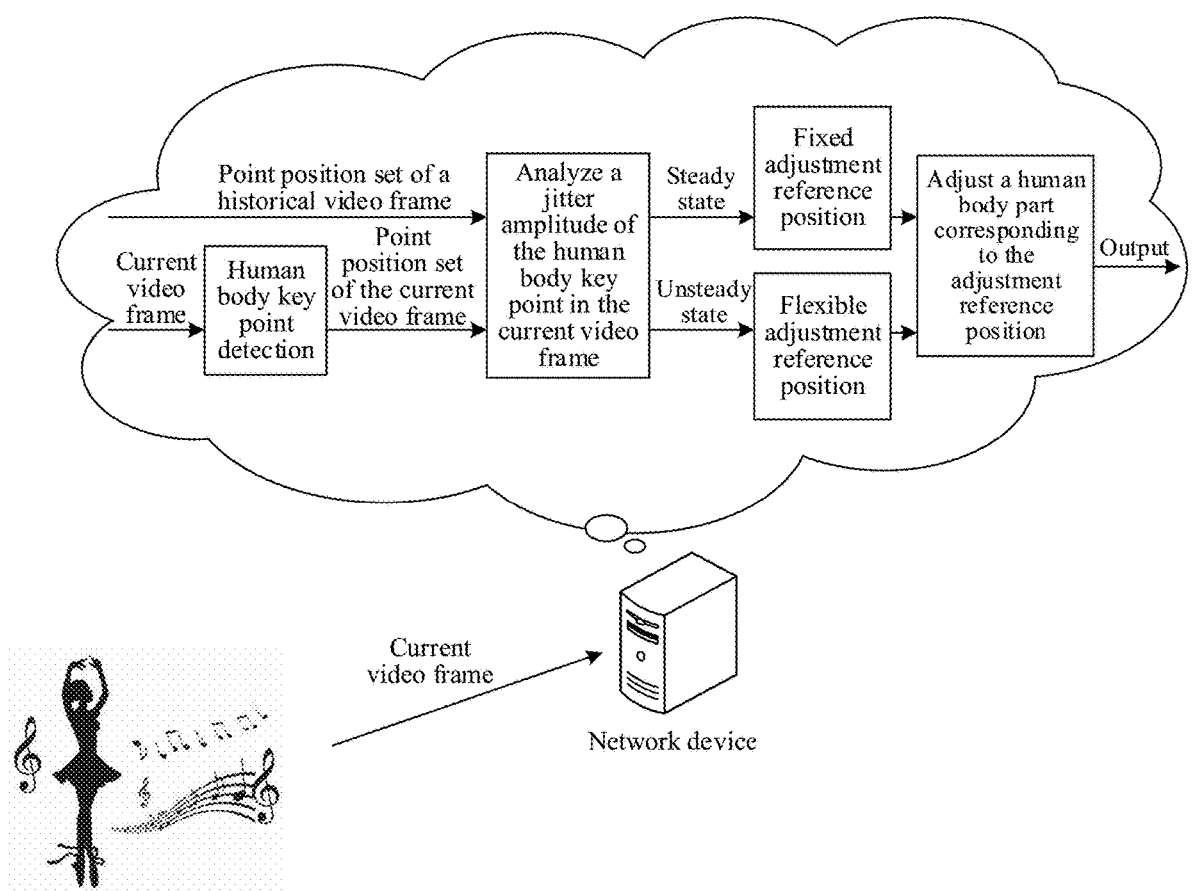
FIG. 1a is a schematic diagram of a scenario of a video data processing method according to some embodiments of this application.

The video data processing apparatus may be specifically integrated into a network device. The network device may be a device such as a terminal or a server. For example, referring to FIG. 1a, the network device may collect and acquire a current video frame from a video stream, and detect a position of a human body key point in the current video frame, to obtain a point position set of a human body in the current video frame. Then, the network device obtains a point position set of the human body in a historical video frame of the video stream, and analyzes a jitter amplitude of the human body key point in the current video frame according to the point position set of the human body in the current video frame and the point position set of the human body in the historical video frame. A preset fixed value is used as an adjustment reference position of the current video frame in a case that it is determined that the current video frame is in a steady state according to the jitter amplitude; conversely, the adjustment reference position of the current video frame is calculated according to the point position set of the human body in the current video frame in a case that it is determined that the current video frame is in an unsteady state according to the jitter amplitude (that is, a flexible adjustment reference position is used). Subsequently, a human body part corresponding to the adjustment reference position in the current video frame is stretched, and the stretched current video frame is outputted. For example, the adjustment reference position may be a waist line, and the part below the waistline position in the current video frame may be stretched according to a golden ratio (that is, a ratio of a leg length to a body length is 0.618), to obtain a result frame, and then the result frame is outputted.

Detailed descriptions are separately provided below.

Figure 1B:
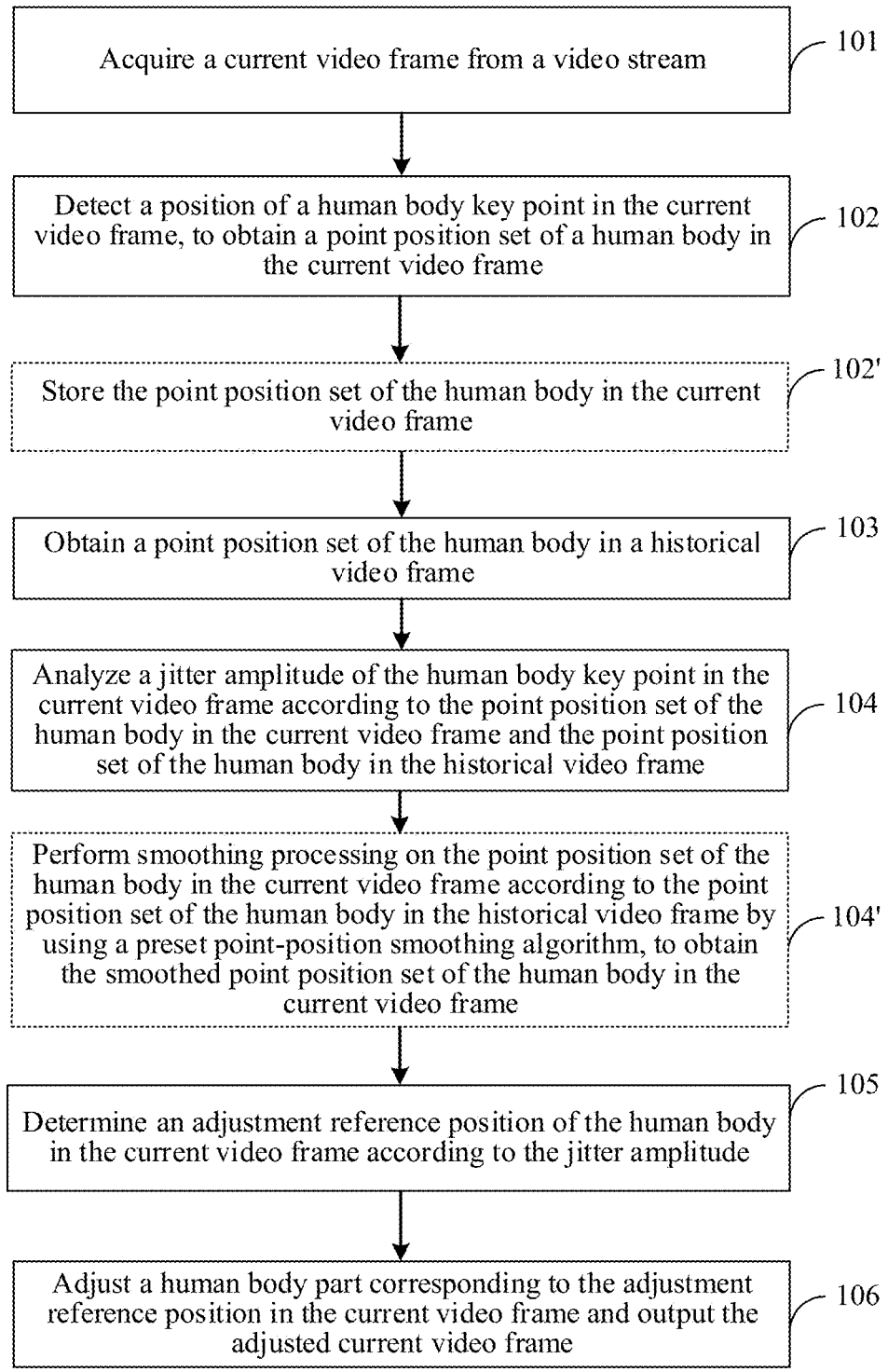
FIG. 1b is a flowchart of a video data processing method according to some embodiments of this application.

FIG. 1b is a flowchart of a video data processing method according to some embodiments of this application. In the embodiment shown in FIG. 1b, descriptions are made from the perspective of the video data processing apparatus. The video data processing apparatus may be specifically integrated into a network device. The network device may be a device such as a terminal or a server. The terminal may include a mobile phone, a tablet computer, a notebook computer, a personal computer (PC), or the like.

As shown in FIG. 1b, a specific process of the video data processing method may be as follows:

101: Acquire a current video frame from a video stream.

For example, specifically, a video image may be acquired by using a local camera component, to obtain the current video frame; or a video image sent by another device, such as another terminal or camera device, may be received, to obtain the current video frame.

102: Detect a position of a human body key point in the current video frame, to obtain a point position set of a human body in the current video frame. For example, details may be as follows:

The position of the human body key point in the current video frame is detected by using a posture estimation model, to obtain the point position set of the human body in the current video frame.

The posture estimation model may be pre-established according to a requirement of actual application, may be provided for the video data processing apparatus after being established by another device, or may be established by the video data processing apparatus. For example, specifically, a plurality of image samples marked with human body key points may be acquired, and then a preset initial posture estimation model is trained by using the image samples, to obtain the posture estimation model. A training manner may be as follows:

An image sample that currently needs to be trained is determined from the image samples, and then the image sample that currently needs to be trained is imported into the initial posture estimation model for detection, to obtain a predicted human body key point of the image sample that currently needs to be trained. The predicted human body key point and the marked human body key point of the image sample that currently needs to be trained are converged, to adjust a parameter in the initial posture estimation model, to complete one time of training. Subsequently, the step of "determining, from the image samples, an image sample that currently needs to be trained" may be performed again, to perform another time of training by using another image sample. In this way, after the training is performed for a plurality of times, the trained posture estimation model can be obtained.

Figure 1C:
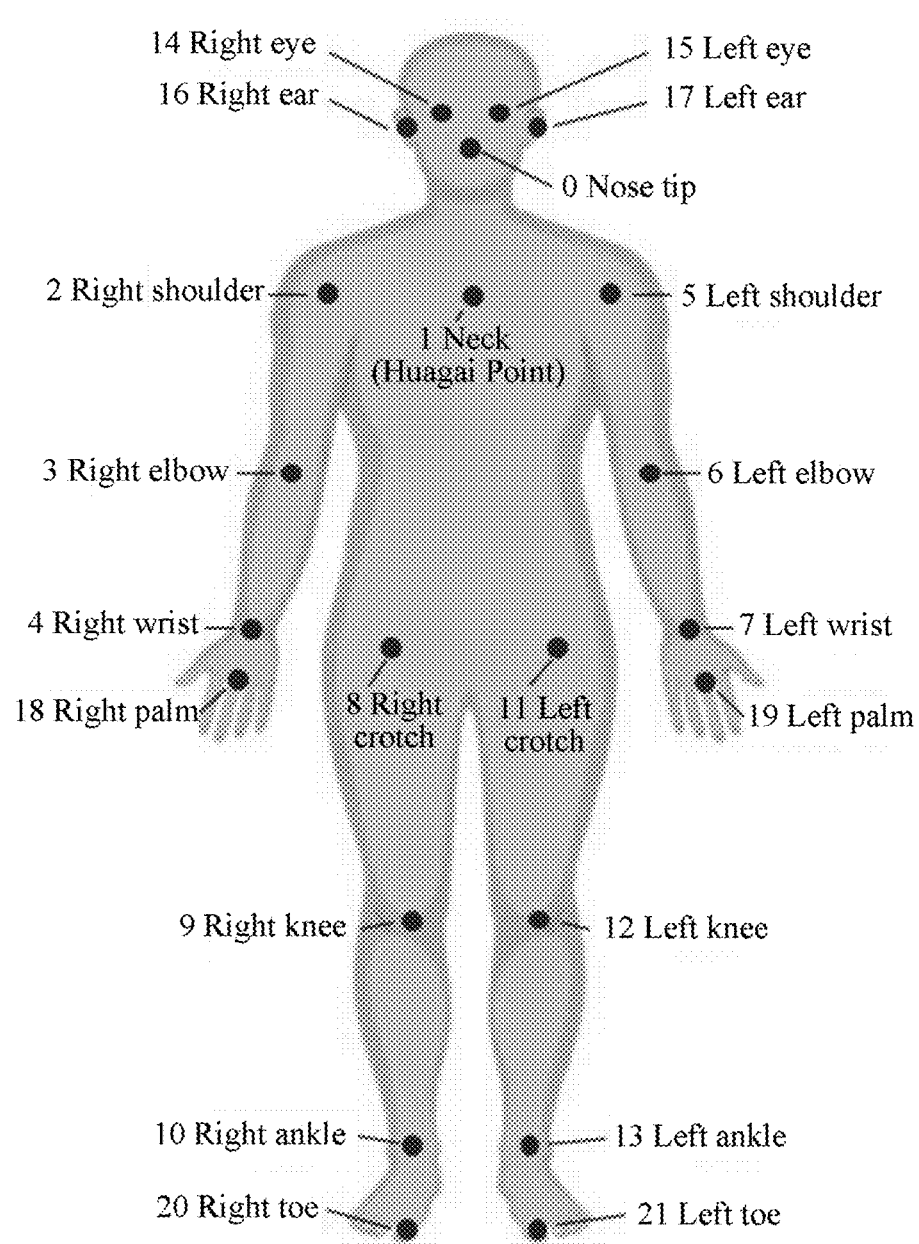
FIG. 1c is a schematic diagram of human body key points in a video data processing method according to some embodiments of this application.

The human body key point is a feature point that can identify a key part of the human body, and may be specifically determined according to a requirement of actual application. For example, as shown in FIG. 1c, the human body key points may include the feature points shown in Table 1:

TABLE 1

| 0. Nose tip | 1. Neck (Huagai Point) |
|---|---|
| 2. Right shoulder | 5. Left shoulder |
| 3. Right elbow | 6. Left elbow |
| 4. Right wrist | 7. Left wrist |
| 8. Right crotch | 11. Left crotch |
| 9. Right knee | 12. Left knee |
| 10. Right ankle | 13. Left ankle |
| 14. Right eye | 15. Left eye |
| 16. Right ear | 17. Left ear |
| 18. Right palm | 19. Left palm |
| 20. Right toe | 21. Left toe |

Due to the change of the human body posture, some human body key points in the point position set of the human body in the current video frame may be lost. For example, when the right arm of the human body is placed behind the back, human body key points such as "right elbow", "right wrist", and "right palm" may not be detected. In this case, valid human body key points at the previous time may still be used. For example, if the human body key points such as "right elbow", "right wrist", and "right palm" in the previous frame of the current video frame are valid, the human body key points such as "right elbow", "right wrist", and "right palm" in the previous frame of the current video frame may be used as the human body key points such as "right elbow", "right wrist", and "right palm" in the point position set of the human body in the current video frame.

After the point position set of the human body in the current video frame is obtained, the method may further include the following steps:

102: Store the point position set of the human body in the current video frame.

In this way, the stored point position set may be directly read if the point position set of the human body in the current video frame needs to be obtained subsequently (the current video frame may be used as the historical video frame of a subsequent video frame). For details, refer to step 103.

103: Obtain a point position set of the human body in a historical video frame.

The historical video frame is a video frame within a preset time range before the current video frame in the video stream. For example, if the current frame is the third frame of a video stream, a historical video frame thereof may be the first frame or the second frame of the video stream.

Figure 1D:
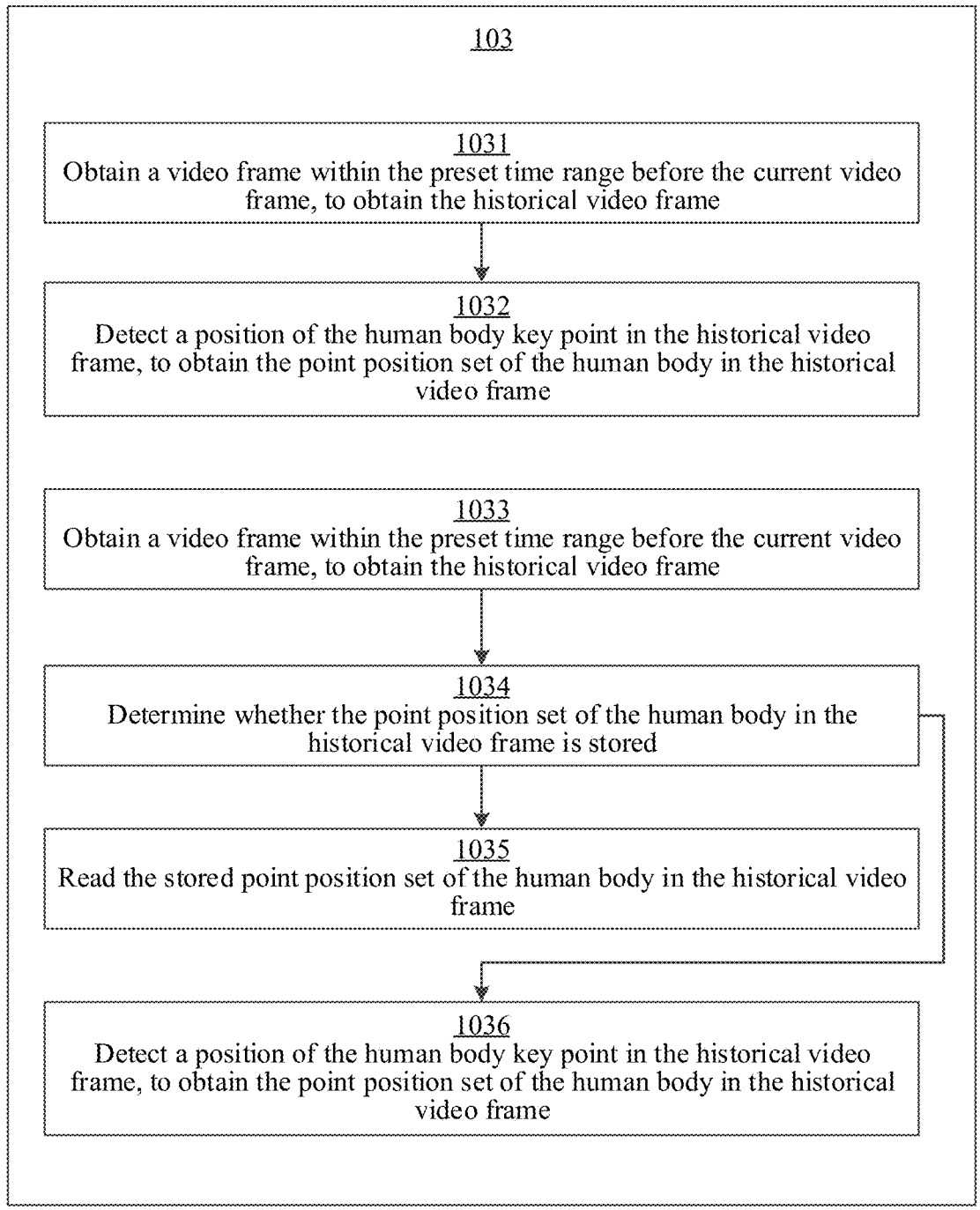
FIG. 1d is a flowchart of obtaining a point position set of a human body in a historical video frame according to some embodiments of this application.

There may be a plurality of manners of obtaining the point position set of the human body in the historical video frame. For example, referring to FIG. 1d, the manner may be as follows:

1031: Obtain a video frame within the preset time range before the current video frame, to obtain the historical video frame.

1032: Detect a position of the human body key point in the historical video frame, to obtain the point position set of the human body in the historical video frame.

In another example, if the point position set of the human body in the historical video frame is already stored heretofore, the point position set of the human body in the historical video frame can be directly read. That is, step 103 may alternatively include:

1033: Obtain a video frame within the preset time range before the current video frame, to obtain the historical video frame.

1034: Determine whether the point position set of the human body in the historical video frame is stored, and if yes, perform step 1035 to read the stored point position set of the human body in the historical video frame; or if not, perform step 1036 to detect a position of the human body key point in the historical video frame, to obtain the point position set of the human body in the historical video frame.

104: Analyze a jitter amplitude of the human body key point in the current video frame according to the point position set of the human body in the current video frame and the point position set of the human body in the historical video frame.

Figure 1E:
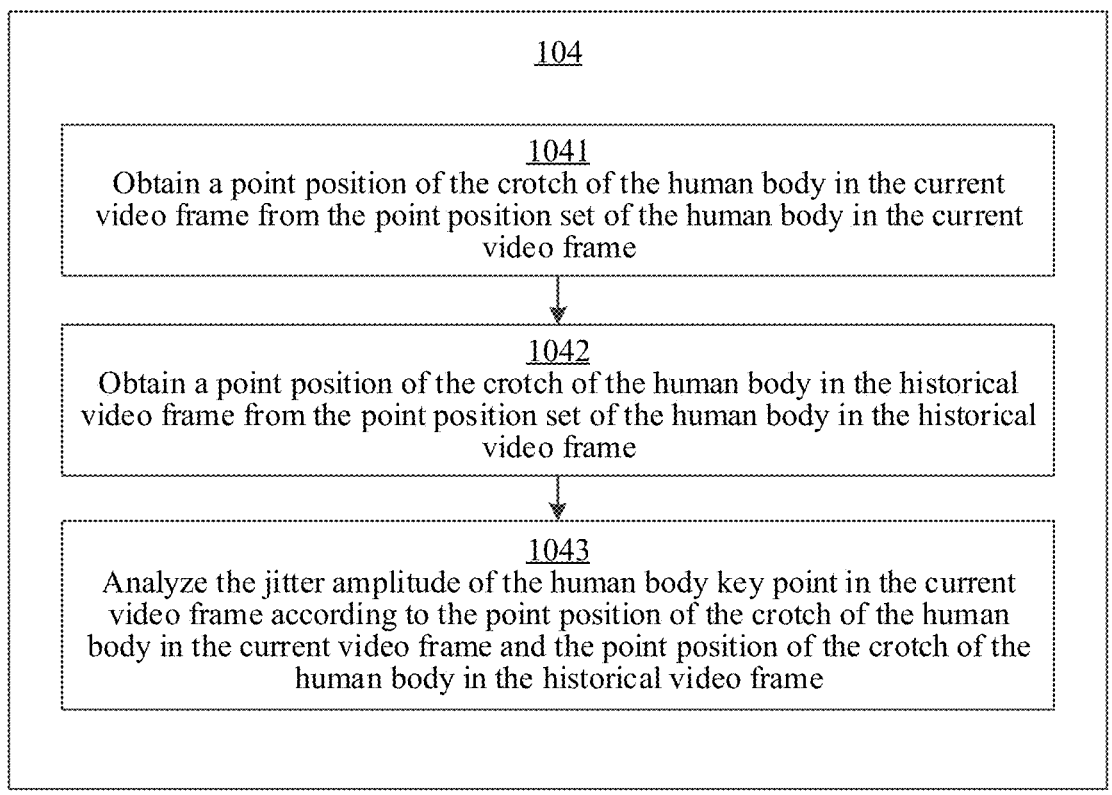
FIG. 1e is a flowchart of analyzing a jitter amplitude of a human body key point in a current video frame according to some embodiments of this application.

After the point position set of the human body in the historical video frame is obtained, the jitter amplitude of the human body key point in the current video frame may be analyzed according to the point position set of the human body in the current video frame and the point position set of the human body in the historical video frame. For example, referring to FIG. 1e, details may be as follows:

1041: Obtain a point position of a crotch of the human body in the current video frame from the point position set of the human body in the current video frame.

For example, referring to Table 1, specifically, the human body key point of "right crotch" and the human body key point of "left crotch" may be obtained from the point position set of the human body in the current video frame, to obtain the point position of the crotch of the human body in the current video frame.

1042: Obtain a point position of the crotch of the human body in the historical video frame from the point position set of the human body in the historical video frame.

For example, referring to Table 1, specifically, the human body key point of "right crotch" and the human body key point of "left crotch" may be obtained from the point position set of the human body in the historical video frame, to obtain the point position of the crotch of the human body in the historical video frame.

1043: Analyze the jitter amplitude of the human body key point in the current video frame according to the point position of the crotch of the human body in the current video frame and the point position of the crotch of the human body in the historical video frame. For example, details may be as follows:

A waistline of the human body in the current video frame is calculated according to the point position of the crotch of the human body in the current video frame, a waistline of the human body in the historical video frame is calculated according to the point position of the crotch of the human body in the historical video frame, and a distance between the waistline of the human body in the current video frame and the waistline of the human body in the historical video frame is calculated, to obtain the jitter amplitude of the human body key point in the current video frame.

For example, specifically, an average value of the "right crotch" point (that is, the No. 8 point in FIG. 1c) and the "left crotch" point (that is, the No. 11 point in FIG. 1c) in the current video frame may be calculated, to obtain the waistline of the human body in the current video frame, and an average value of the "right crotch" point (that is, the No. 8 point in FIG. 1c) and the "left crotch" point (that is, the No. 11 point in FIG. 1c) in the historical video frame may be calculated, to obtain the waistline of the human body in the historical video frame. Then, the distance between the waistline of the human body in the current video frame and the waistline of the human body in the historical video frame is calculated, to obtain the jitter amplitude of the human body key point in the current video frame.

Subsequently, it may be determined whether the jitter amplitude is less than a preset threshold, and if yes, it is determined that the current video frame is in a steady state, and therefore step 1051 is performed; or if not, it is determined that the current video frame is in an unsteady state, and therefore step 1052 is performed.

The preset threshold may be set according to a requirement of actual application. For example, it may be set that waistlines of two adjacent frames float within 10% in the steady state and float beyond 10% in the unsteady state. Certainly, it may alternatively be set that it is determined that the current video frame is in the steady state if waistlines of consecutive X1 frames float within a specific amplitude such as 10%, and it is determined that the current video frame is in the unsteady state if waistlines of consecutive X2 frames float beyond a specific amplitude such as 10%, and the like. X1 and X2 may also be set according to a requirement of actual application. For example, X1 may be 60, and X2 may be 100. Details are not described herein.

When the human body moves violently (such as dancing), there may be a relatively large difference between point positions of two adjacent frames, and this may cause intense jitter of the point position. Therefore, to avoid the problem and improve a processing effect, before the jitter amplitude of the human body key point is analyzed, smoothing processing may further be performed on the point positions. That is, before step 104, the video data processing method may further include:

104': Perform smoothing processing on the point position set of the human body in the current video frame according to the point position set of the human body in the historical video frame by using a preset point-position smoothing algorithm, to obtain the smoothed point position set of the human body in the current video frame.

In this case, step 104 may be specifically: analyzing the jitter amplitude of the human body key point in the current video frame according to the smoothed point position set of the human body in the current video frame and the point position set of the human body in the historical video frame.

For example, specifically, the point position of the crotch of the human body in the current video frame may be obtained from the smoothed point position set of the human body in the current video frame, and the point position of the crotch of the human body in the historical video frame is obtained from the point position set of the human body in the historical video frame. Then the jitter amplitude of the human body key point in the current video frame is analyzed according to the point position of the crotch of the human body in the current video frame and the point position of the crotch of the human body in the historical video frame.

Figure 1F:
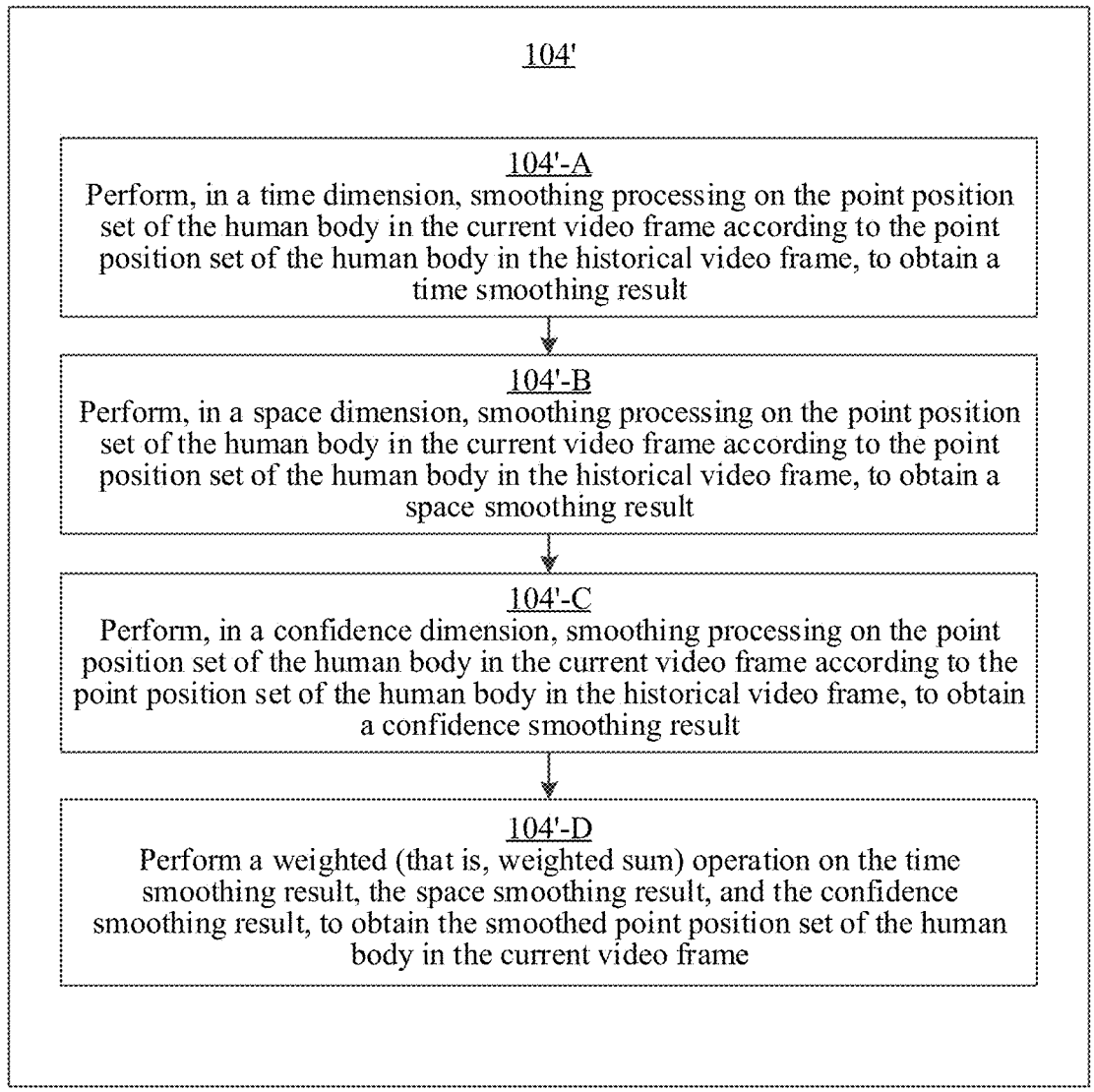
FIG. 1f is a flowchart of performing smoothing processing on a point position set of a human body in a current video frame according to some embodiments of this application.

The point-position smoothing algorithm may be set according to a requirement of actual application. For example, specifically, smoothing processing may be performed on the point position set of the human body in the current video frame in dimensions such as time, space, and confidence. That is, referring to FIG. 1f, step 104' may include:

104'-A: Perform, in a time dimension, the smoothing processing on the point position set of the human body in the current video frame according to the point position set of the human body in the historical video frame, to obtain a time smoothing result.

For example, specifically, N frames (N is a positive integer greater than 1) may be selected from the historical video frames. Then, the point position set of the human body in the current video frame is smoothed among the N frames in the time dimension. For example, a weighted (that is, weighted sum) operation may be performed on time vectors of the N frames, as follows:

$$P_{time_i} = \Sigma_{i-N < j \leq i} \alpha_j P_j;$$

$P_{time_i}$ is a time smoothing result of a human body key point S in the point position set of the current video frame (that is, the $i^{th}$ frame), $P_j$ is a time vector of the human body key point S in a frame j in the N historical video frames, and $\alpha_j$ is a weight of $P_j$. A closer historical video frame to the current video frame indicates a greater weight $\alpha_j$.

104'-B: Perform, in a space dimension, the smoothing processing on the point position set of the human body in the current video frame according to the point position set of the human body in the historical video frame, to obtain a space smoothing result.

For example, specifically, the previous frame of the current video frame may be selected from the historical video frames, and then an offset is added to a space vector of a human body key point in a point position set of the previous frame, to obtain a space smoothing result of a corresponding human body key point in the current video frame. For example, an offset is added to the right crotch point in the point position set of the previous frame, to obtain a space smoothing result of the right crotch point in the current video frame. By analogy, space smoothing results corresponding to all the human body key points (that is, all the point positions in the point position set) in the current video frame may be obtained. This is expressed by using a formula as follows:

$$P_{space_i} = P_{i-1} + f(P_i - P_{i-1});$$

$P_{space_i}$ is a space smoothing result of a human body key point S in the point position set of the current video frame (that is, the $i^{th}$ frame), $P_{i-1}$ is a space vector of the human body key point S in the point position set of the previous frame (that is, the $(i-1)^{th}$ frame) of the current video frame, $P_i$ is a space vector of the human body key point S in the point position set of the human body in the current video frame, and f is an offset function (non-linear) that has a damping effect. By means of the smoothing processing in the space dimension, a difference between point positions of two adjacent frames can be reduced.

104'-C: Perform, in a confidence dimension, the smoothing processing on the point position set of the human body in the current video frame according to the point position set of the human body in the historical video frame, to obtain a confidence smoothing result.

For example, specifically, M frames (M is a positive integer greater than 1) may be selected from the historical video frames. Then, the point position set of the human body in the current video frame is smoothed among the M frames in the confidence dimension. For example, a weighted (that is, weighted sum) operation may be performed on confidence of the M frames, as follows:

$$P_{score_i} = \Sigma_{i-M<k\leq i} \beta_k P_k;$$

$P_{score_i}$ is a confidence smoothing result of a human body key point S in the point position set of the current video frame (that is, the $i^{th}$ frame), $P_k$ is a confidence vector of the human body key point S in a frame k in the M historical video frames, and $\beta_k$ is a weight of $P_k$, and may be obtained by dividing confidence $score_k$ of the frame of which a weight needs to be calculated by a sum of confidence $\Sigma score$ of the M historical video frames, as follows:

$$\beta_k = score_k/\Sigma score.$$

The confidence may be obtained when the position of the human body key point is detected. Refer to step 102 for details. A greater confidence indicates a more accurate detected position of the human body key point.

104'-D: Perform a weighted (that is, weighted sum) operation on the time smoothing result, the space smoothing result, and the confidence smoothing result, to obtain the smoothed point position set of the human body in the current video frame. This may be expressed by using a formula as follows:

$$P_i = \gamma_1 P_{time_i} + \gamma_2 P_{space_i} + \gamma_3 P_{score_i}$$

$P_i$ is a total smoothing result of a human body key point S in the point position set of the current video frame (that is, the $i^{th}$ frame). By analogy, total smoothing results of all the human body key points in the point position set of the current video frame are calculated, to obtain the smoothed point position set of the human body in the current video frame (the smoothed point position set includes total smoothing results of all the human body key points in the point position set of the current video frame). $\gamma_1$, $\gamma_2$, and $\gamma_3$ are respectively weights of $P_{time_i}$, $P_{space_i}$, and $P_{score_i}$. The weights may be specifically set according to a requirement of actual application, and details are not described herein again.

105: Determine an adjustment reference position of the human body in the current video frame according to the jitter amplitude.

In some embodiments, the adjustment reference position may be a waistline position. Correspondingly, the preset fixed value may be a preset waistline value. For example, referring to FIG. 1g, details may be as follows:

1051: Use a preset waistline value as the waistline position of the current video frame in a case that it is determined that the current video frame is in a steady state according to the jitter amplitude.

The preset waistline value may be set according to a requirement of actual application. For example, an average waistline position of first several historical video frames of the current frame may be used as the waistline value, or a waistline position of the previous frame of the current frame may be used as the waistline value. Details are not described herein.

When a person dances or moves slightly, the waistline floats up and down, causing changes of a background stretch zone. If each frame is stretched according to an actual waistline of the frame, the background deformation floats relatively greatly and the background appears to be unnatural. When a person dances or moves slightly, the waistline does not change greatly, and slight changes of the waistline has little effect on the leg-lengthening effect. Therefore, when the human body is relatively stable, that is, when the current video frame is in the steady state, a fixed waistline position may be used as a candidate reference of stretching, to alleviate floating of the background deformation, so that the background appears to be more natural, thereby improving a processing effect.

1052: Calculate the waistline position of the current video frame according to the point position set of the human body in the current video frame in a case that it is determined that the current video frame is in an unsteady state according to the jitter amplitude.

Since the current video frame is in the unsteady state, it indicates that the waistline of the current video frame floats relatively greatly as compared with that of the historical video frames. If the preset waistline value is still used as the waistline position of the current video frame, subsequent stretching may be inaccurate, affecting a stretching effect. Therefore, in this case, the waistline position of the current video frame may be calculated according to the point position set of the human body in the current video frame. Details may be as follows:

A point position of the crotch of the human body in the current video frame is obtained from the point position set of the human body in the current video frame, the waistline of the human body in the current video frame is calculated according to the point position of the crotch of the human body in the current video frame, and the waistline position of the current video frame is determined according to the waistline obtained through calculation.

For example, specifically, the "right crotch" point and the "left crotch" point of the human body in the current video frame may be obtained from the point position set of the human body in the current video frame, and then an average value of the "right crotch" point and the "left crotch" point is calculated, to obtain the waistline of the human body in the current video frame. A position (such as a coordinate) of the waistline may be directly used as the waistline position of the current video frame, or may be used as the waistline position of the current video frame after fine adjustment is performed on the position of the waistline according to a preset policy.

The preset policy may be determined according to a requirement of actual application, and details are not described herein.

106: Adjust a human body part corresponding to (e.g., below) the adjustment reference position in the current video frame and output the adjusted current video frame.

In some embodiments, when the adjustment reference position is the waistline position, step 106 may be: stretching the human body part below the waistline position in the current video frame, and outputting the stretched current video frame. For example, details may be as follows:

The human body part below the waistline position in the current video frame is stretched according to a golden ratio (that is, a ratio of a leg length to a body length is 0.618), to obtain a result frame, and the result frame is outputted.

Alternatively, the human body part below the waistline position in the current video frame may be stretched according to a preference of a user or setting, to obtain a result frame, and the result frame is outputted.

After the stretching, there is an obvious slope jump on a stretch boundary (that is, the waistline position). Consequently, the background appears to be unnatural, and an image display effect is affected. Therefore, after the stretching, smoothing processing may further be performed on the slope of the part, to eliminate the "jump". That is, before the step of "stretching the human body part below the waistline position in the current video frame according to a golden ratio", the video data processing method may further include:

performing smoothing processing on the slope of the waistline position part in the stretched current video frame, to obtain a result frame.

A policy of the smoothing processing may be determined according to a requirement of actual application. For example, a transition zone may be disposed at the waistline position part. For example, a 20% transition zone is set. Then, the slope in the transition zone is decreased, to make the stretch border smoother and softer.

If there are a plurality of human bodies in the current video frame, there are necessarily a plurality of waistline positions. In this case, when stretching is performed, one waistline position may be selected from the plurality of waistline positions as a target waistline position for stretching. For example, a highest waistline position may be selected as the target waistline position. That is, the step of "stretching the human body part below the waistline position in the current video frame, and outputting the stretched current video frame" may include:

selecting a highest waistline position from the plurality of waistline positions of the current video frame as a target waistline position, stretching the human body part below the target waistline position in the current video frame, and outputting the stretched current video frame.

For example, specifically, the human body part below the target waistline position in the current video frame may be stretched according to a golden ratio, and the stretched current video frame is outputted.

Smoothing processing may be performed on the slope of the target waistline position part in the stretched current video frame, and then the current video frame is outputted. That is, the step of "stretching the human body part below the target waistline position in the current video frame, and outputting the stretched current video frame" may include:

stretching the human body part below the target waistline position in the current video frame according to a golden ratio, performing smoothing processing on the slope of the target waistline position part in the stretched current video frame, to obtain a result frame, and outputting the result frame.

When there are a plurality of human bodies in the current video frame, a stretch level may be determined according to a requirement of actual application. For example, an average value of stretch levels of the plurality of human bodies may be obtained for stretching. For example, an optimum stretch level of each human body may be determined according to a golden ratio of a leg length to a body length of each human body in the current video frame. Then, an average value of the stretch levels of all the human bodies in the current video frame is calculated, and the part below the target waistline position in the current video frame is stretched according to the average value.

In this embodiment of this application, the stretching the human body part below the waistline position (or the target waistline position) may include stretching only a human body image zone below the waistline position (or the target waistline position) in the video frame, or may include performing overall stretching on an entire image zone below the waistline position (or the target waistline position) in the video frame. When only the human body image zone is stretched, the human body image zone may be extracted from the video frame as a foreground part according to the detected human body key points, and a remaining part obtained after the human body image zone is extracted is used as a background part. Then, an image zone below the waistline position in the foreground part is stretched, and the stretched foreground part and the background part are superimposed, to obtain the stretched current video frame. Details are not described herein.

After step 106 is performed, the step of acquiring a current video frame (that is, step 101) may be performed again, to adjust the next video frame until video capture ends. In this way, the human body in the video can be adjusted in real time, for example, the function of adjusting the human body in the video can be implemented.

It can be learned from the foregoing that in this embodiment, after the current video frame is acquired, the position of the human body key point in the current video frame may be detected, to obtain the point position set of the human body in the current video frame. Then the point position set of the human body in the historical video frame is obtained, and the jitter amplitude of the human body key point in the current video frame is analyzed according to the point position set of the human body in the current video frame and the point position set of the human body in the historical video frame. The adjustment reference position of the human body in the current video frame is determined according to the jitter amplitude. For example, the preset fixed value is used as the adjustment reference position of the current video frame in a case that it is determined that the current video frame is in the steady state according to the jitter amplitude; conversely, the adjustment reference position of the current video frame is calculated according to the point position set of the human body in the current video frame in a case that the current video frame is in the unsteady state. Subsequently, the human body part corresponding to the adjustment reference position in the current video frame may be adjusted, and the adjusted current video frame is outputted, thereby performing real-time adjustment on the human body in the current frame. In this solution, only the human body part corresponding to the adjustment reference position is adjusted. In addition, a fixed adjustment reference position is used for a video frame having a small jitter amplitude, and a flexible adjustment reference position is used only for a video frame having a relatively large jitter amplitude. Therefore, the human body in the video frame can be adjusted in real time, to improve an adjustment effect; meanwhile, natural and smooth background deformation in the video frame is ensured to a large extent, thereby greatly improving the robustness and adaptability of a real-time adjustment function and helping to improve the display effect of the video image.

According to the method described in the foregoing embodiment, descriptions are made below by using an example in which the video data processing apparatus is specifically integrated into a network device.

Figure 2A:
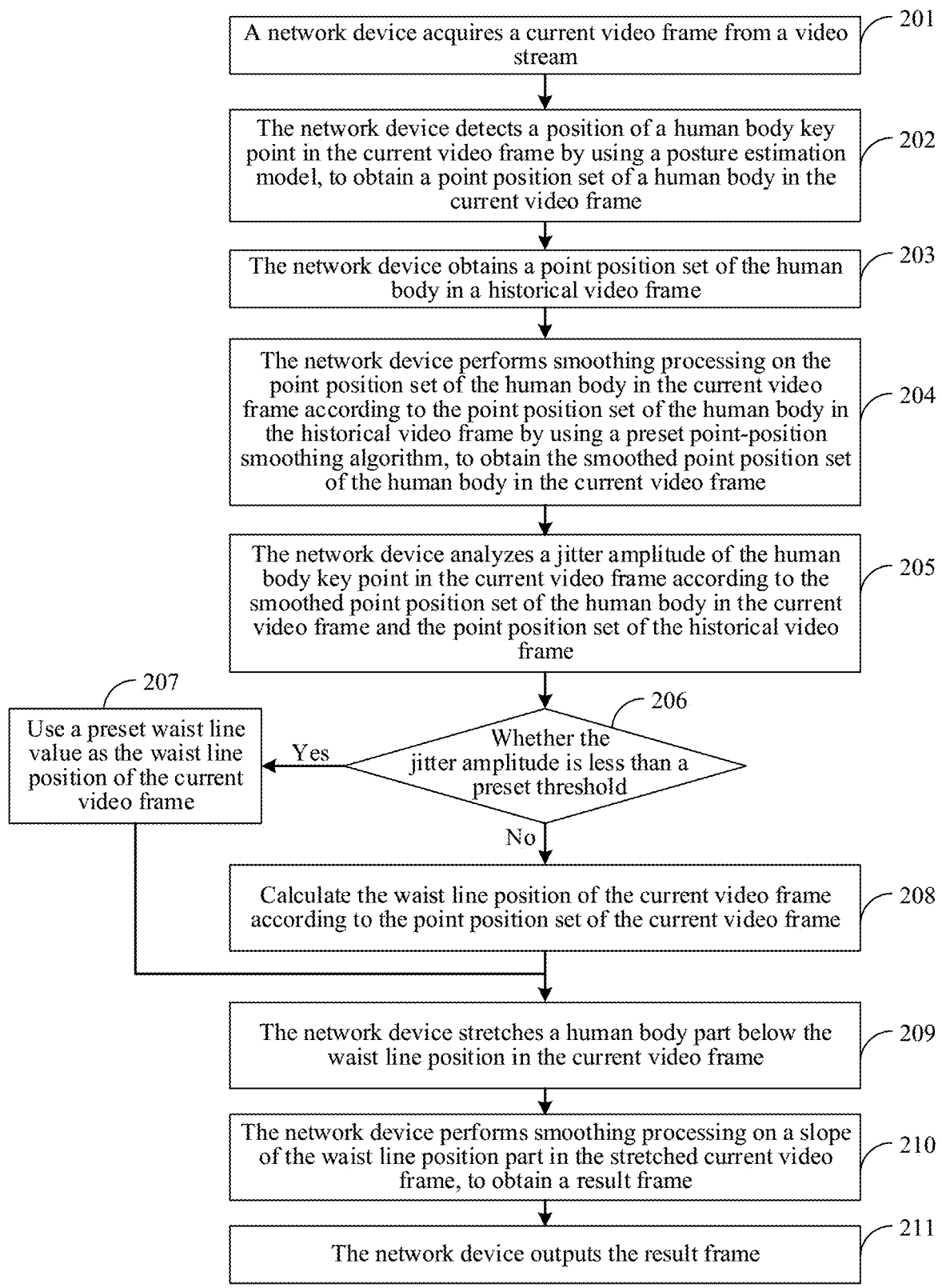
FIG. 2a is another flowchart of a video data processing method according to some embodiments of this application.

As shown in FIG. 2*a*, a specific process of a video data processing method may be as follows:

201: A network device acquires a current video frame from a video stream.

For example, the network device may acquire a video image by using a local camera component to obtain the current video frame, or may receive a video image sent by another device, such as another terminal or camera device, to obtain the current video frame.

Figure 2B:
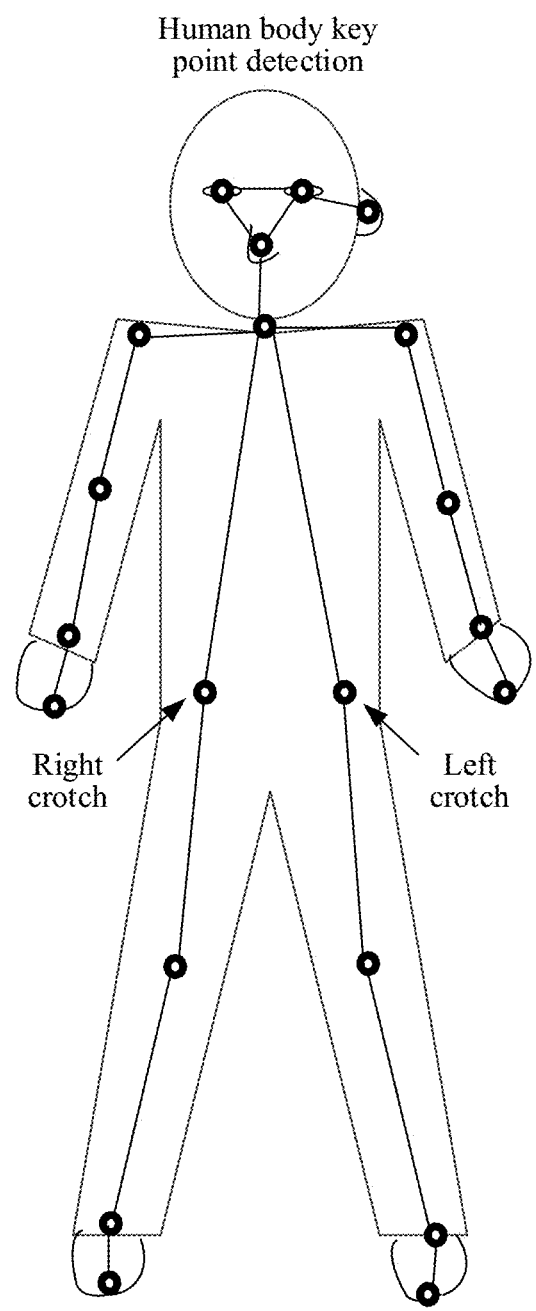
FIG. 2b is a schematic diagram of position detection of human body key points in a video data processing method according to some embodiments of this application.
Figure 2C:
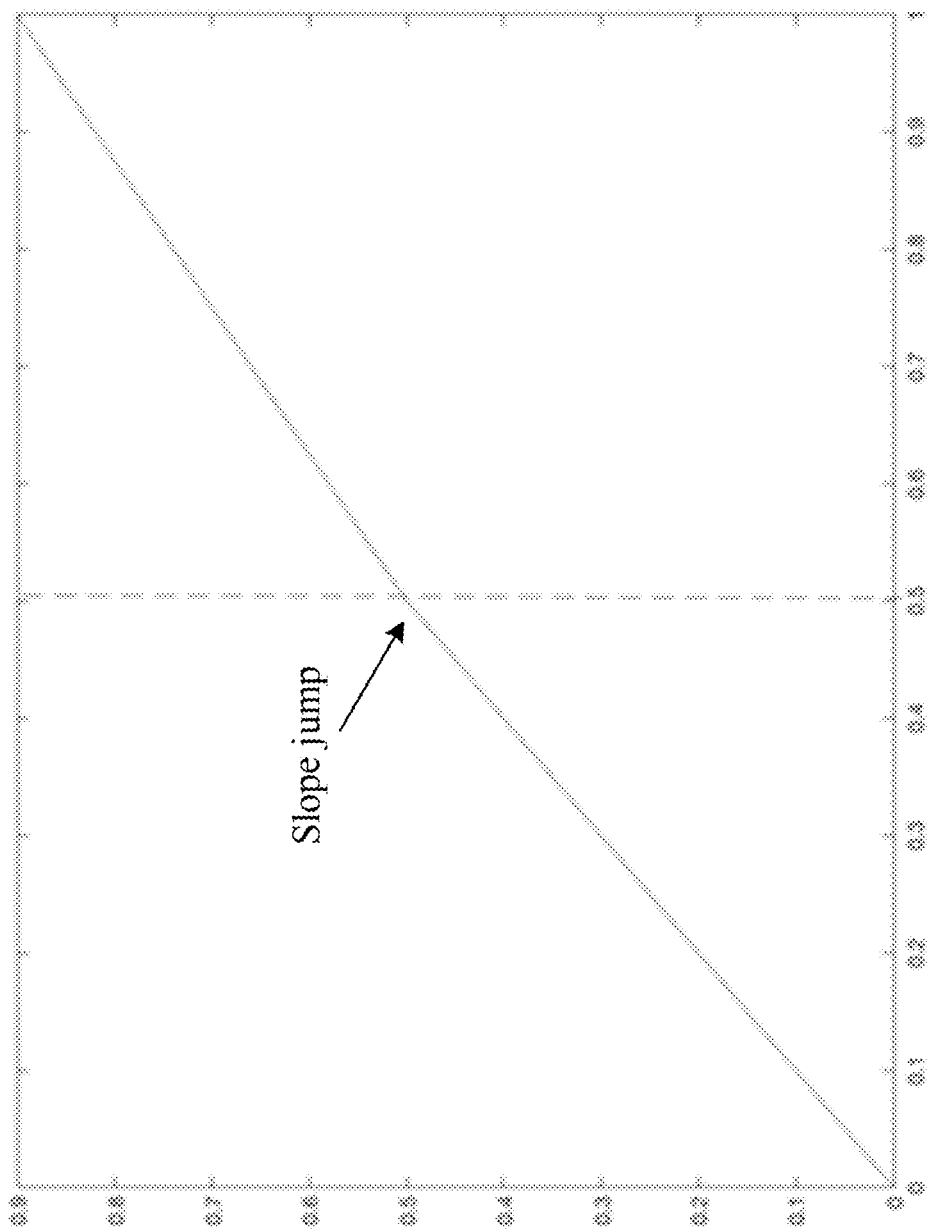
FIG. 2c is a schematic diagram of a slope change of a stretch zone in a method according to some embodiments of this application.
Figure 2D:
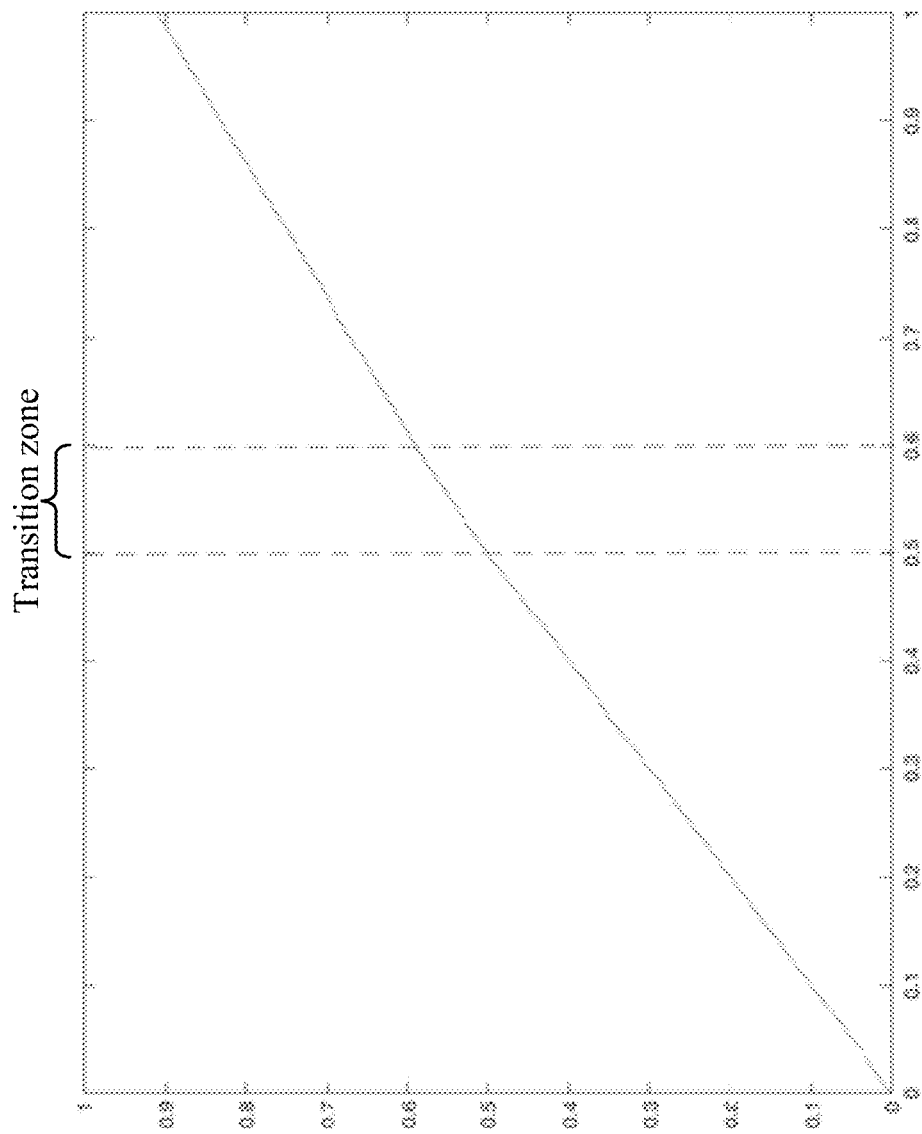
FIG. 2d is a schematic diagram of a slope change of a smoothed stretch zone in a method according to some embodiments of this application.
Figure 2E:
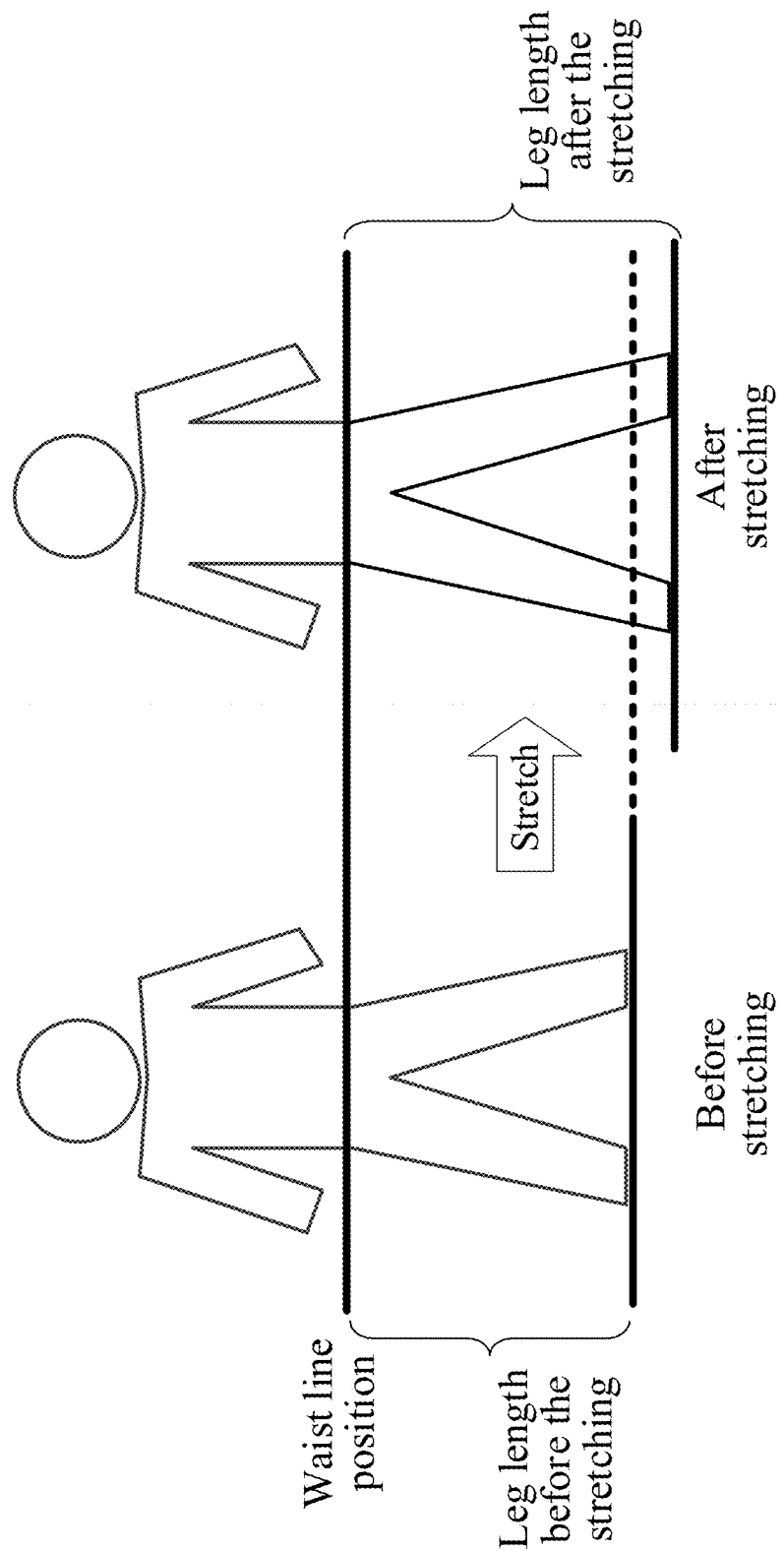
FIG. 2e is an exemplary diagram of a current video frame before stretching and after stretching in a video data processing method according to some embodiments of this application.
Figure 2F:
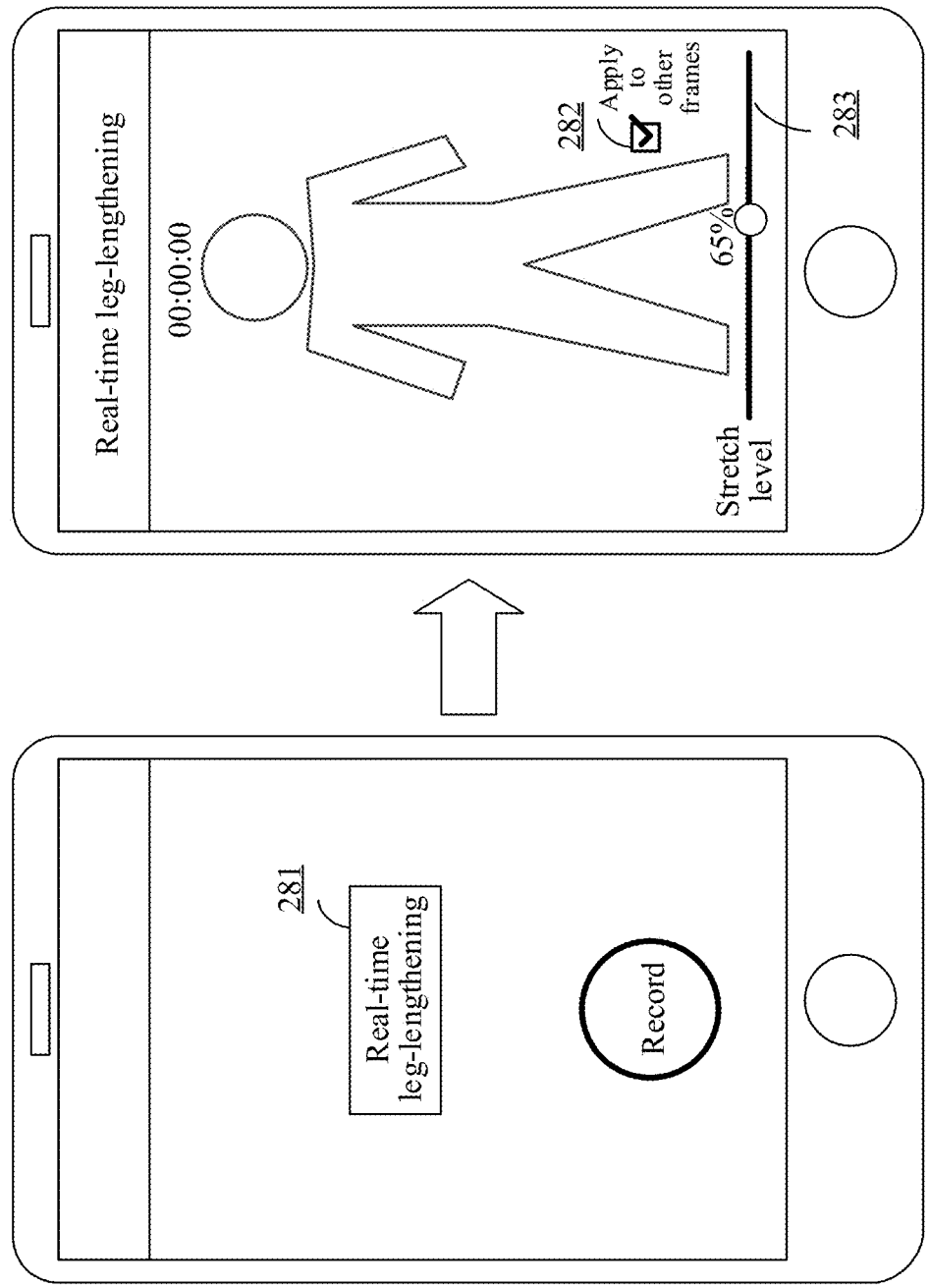
FIG. 2f is an exemplary diagram of a user interface in a video data processing method according to some embodiments of this application.

For example, as shown in FIG. 2f, when a user needs to perform real-time leg-lengthening on the video, the user may tap a "real-time leg-lengthening" trigger key 281 in an interface to trigger the leg-lengthening function.

Further, a "stretch" level may be set by using another interface such as a "trigger key", an "input box", or a "slider". For example, referring to FIG. 2f, if the user adjusts the "slider" 283 to "65%", it indicates that a leg length of the human body in the current video frame can be increased by 65% of the original length.

Another interface may further be set in the user interface to call another preset functional function, to implement a function corresponding to the functional function. For example, a "selection box" 282 is set. When the user selects the "selection box" 282, a preset functional function is called, so that a "stretch" level set by the user at the current video frame is applicable to other video frames by default (certainly, if the user needs to reset the stretch level of the human leg in a frame, the default item may also be adjusted by using an interface used for setting the "stretch" level in the current video frame). When the user does not select the "selection box" 282, the user can flexibly set, frame by frame, the stretch level of the human leg in the video frame. For example, referring to FIG. 2f, adjustment may also be performed by using the "slider" 283 in the user interface, and details are not described herein again.

202: The network device detects a position of a human body key point in the current video frame by using a posture estimation model, to obtain a point position set of a human body in the current video frame.

The posture estimation model may be pre-established according to a requirement of actual application. For example, specifically, a plurality of image samples marked with human body key points may be acquired, and then a preset initial posture estimation model is trained by using the image samples, to obtain the posture estimation model. For details, refer to the foregoing embodiments, and details are not described herein again.

The human body key point is a feature point that can identify a key part of the human body, and may be specifically determined according to a requirement of actual application. For example, the human body key points may specifically include the 22 human body key points shown in FIG. 1c and Table 1: the nose tip, the neck (Huagai Point), the right shoulder, the right elbow, the right wrist, the left shoulder, the left elbow, the left wrist, the right crotch, the right knee, the right ankle, the left crotch, the left knee, the left ankle, the right eye, the left eye, the right ear, the left ear, the right palm, the left palm, the right toe, and the left toe.

For example, referring to FIG. 2b, after acquiring the current video frame, the network device may import the current video frame into the posture estimation model for detection. After detecting the positions of the human body key points in the current video frame, the posture estimation model may output detected positions of a plurality of human body key points (point positions for short), and add the positions of the plurality of human body key points into the same set, to obtain the point position set of the human body in the current video frame.

Due to the change of the human body posture, several human body key points may not be detected when the positions of the human body key points in the current video frame are detected. For example, when the left arm of the human body is placed behind the back, human body key points such as "left elbow", "left wrist", and "left palm" may not be detected. In this case, valid human body key points at the previous time may still be used. For example, if the human body key points such as "left elbow", "left wrist", and "left palm" in the frame before last of the current video frame are valid, the human body key points such as "left elbow", "left wrist", and "left palm" in the frame before last of the current video frame may be used as the human body key points such as "left elbow", "left wrist", and "left palm" in the point position set of the human body in the current video frame, and so on.

After obtaining the point position set of the human body in the current video frame, the network device may further store the point position set of the human body in the current video frame. In this way, the stored point position set may be directly read if the point position set of the human body in the current video frame needs to be obtained subsequently (the current video frame may be used as the historical video frame of a subsequent video frame). For details, refer to step 203.

203: The network device obtains a point position set of the human body in a historical video frame of the video stream.

For example, the network device may obtain a video frame within a preset time range before the current video frame to obtain the historical video frame, and then detect a position of the human body key point in the historical video frame, to obtain the point position set of the human body in the historical video frame.

In another example, if the point position set of the human body in the historical video frame is already stored heretofore, the network device may directly read the point position set of the human body in the historical video frame. That is, the step that "the network device obtains a point position set of the human body in a historical video frame" may alternatively include:

The network device obtains, from the video stream, a video frame within a preset time range before the current video frame to obtain the historical video frame, and determines whether the point position set of the human body in the historical video frame is stored; and if yes, reads the stored point position set of the human body in the historical video frame; or if not, detects a position of the human body key point in the historical video frame, to obtain the point position set of the human body in the historical video frame.

The preset time range may be set according to a requirement of actual application. For example, an example is used in which the current video frame is specifically the tenth frame, and the preset time range is five frames. In this case, the network device may obtain the fifth frame, the sixth frame, the seventh frame, the eighth frame, and the ninth frame as the historical video frames; then determine whether there are point position sets of the human body in the historical video frames; and if yes, directly read the corresponding point position set; or if not, detect a position of the human body key point in the historical video frame. For example, if a point position set corresponding to the ninth frame is not stored, a position of the human body key point in the ninth frame needs to be detected, to obtain the point position set of the ninth frame, and so on.

A manner of detecting the position of the human body key point in the historical video frame is similar to the manner of detecting the human body key point in the current video frame. That is, the position of the human body key point in the historical video frame may be specifically detected by using a posture estimation model. For the posture estimation model, reference may be made to the descriptions in step 202, and details are not described herein again.

204: The network device performs smoothing processing on the point position set of the human body in the current video frame according to the point position set of the human body in the historical video frame by using a preset point-position smoothing algorithm, to obtain the smoothed point position set of the human body in the current video frame.

The point-position smoothing algorithm may be set according to a requirement of actual application. For example, specifically, smoothing processing may be performed on the point position set of the human body in the current video frame in dimensions such as time, space, and confidence. Details may be as follows:

(1) Time Dimension

The network device performs, in a time dimension, the smoothing processing on the point position set of the human body in the current video frame according to the point position set of the human body in the historical video frame, to obtain a time smoothing result.

(2) Space Dimension

The network device performs, in a space dimension, the smoothing processing on the point position set of the human body in the current video frame according to the point position set of the human body in the historical video frame, to obtain a space smoothing result.

(3) Confidence Dimension

The network device performs, in a confidence dimension, the smoothing processing on the point position set of the human body in the current video frame according to the point position set of the human body in the historical video frame, to obtain a confidence smoothing result.

For a specific process of calculating the time smoothing result, the space smoothing result, and the confidence smoothing result, refer to step 104'-A to step 104'-C, and details are not described herein again. After the time smoothing result, the space smoothing result, and the confidence smoothing result are obtained, a weighted (that is, weighted sum) operation may be performed on the time smoothing result, the space smoothing result, and the confidence smoothing result, to obtain the smoothed point position set of the human body in the current video frame. Refer to step 104'-D, and details are not described herein again.

205: The network device analyzes a jitter amplitude of the human body key point in the current video frame according to the smoothed point position set of the human body in the current video frame and the point position set of the human body in the historical video frame. For example, referring to Table 1, details may be as follows:

The network device obtains the human body key point of "right crotch" and the human body key point of "left crotch" from the point position set of the human body in the current video frame, to obtain a point position of the crotch of the human body in the current video frame, and obtains the human body key point of "right crotch" and the human body key point of "left crotch" from the point position set of the human body in the historical video frame, to obtain a point position of the crotch of the human body in the historical video frame. Then, the network device calculates the waistline of the human body in the current video frame according to the point position of the crotch of the human body in the current video frame, calculates the waistline of the human body in the historical video frame according to the point position of the crotch of the human body in the historical video frame, and calculates a distance between the waistline of the human body in the current video frame and the waistline of the human body in the historical video frame, to obtain the jitter amplitude of the human body key point in the current video frame.

For example, specifically, an average value of the "right crotch" point and the "left crotch" point in the current video frame may be calculated, to obtain the waistline of the human body in the current video frame, and an average value of the "right crotch" point and the "left crotch" point in the historical video frame may be calculated, to obtain the waistline of the human body in the historical video frame. Then, the distance between the waistline of the human body in the current video frame and the waistline of the human body in the historical video frame is calculated, to obtain the jitter amplitude of the human body key point in the current video frame.

206: The network device determines whether the jitter amplitude is less than a preset threshold, and if yes, determines that the current video frame is in a steady state, and therefore performs step 207, or if not, determines that the current video frame is in an unsteady state, and therefore performs step 208.

The preset threshold may be set according to a requirement of actual application. For example, the preset threshold is 10%. In this case, the network device may determine whether the jitter amplitude (that is, waistline floating between two adjacent frames) is less than 10%. If yes, it is determined that the current video frame is in the steady state, and therefore, step 207 is performed; or if not, for example, the floating between two adjacent frames is 20%, it can be determined that the current video frame is in the unsteady state, and therefore, step 208 is performed.

207: The network device uses a preset waistline value as the waistline position of the current video frame in a case that it is determined that the current video frame is in the steady state according to the jitter amplitude.

The preset waistline value may be set according to a requirement of actual application. For example, an average waistline position of first several historical video frames of the current frame may be used as the waistline value, or a waistline position of the previous frame of the current frame may be used as the waistline value. Details are not described herein.

208: The network device calculates the waistline position of the current video frame according to the point position set of the human body in the current video frame in a case that it is determined that the current video frame is in the unsteady state according to the jitter amplitude. For example, details may be as follows:

A point position of the crotch of the human body in the current video frame is obtained from the point position set of the human body in the current video frame, the waistline of the human body in the current video frame is calculated according to the point position of the crotch of the human body in the current video frame, and the waistline position of the current video frame is determined according to the waistline obtained through calculation.

For example, specifically, the "right crotch" point and the "left crotch" point of the human body in the current video frame may be obtained from the point position set of the human body in the current video frame, and then an average value of the "right crotch" point and the "left crotch" point is calculated, to obtain the waistline of the human body in the current video frame. A position (such as a coordinate) of the waistline may be directly used as the waistline position of the current video frame, or may be used as the waistline position of the current video frame after fine adjustment is performed on the position of the waistline according to a preset policy.

The preset policy may be determined according to a requirement of actual application, and details are not described herein.

209: The network device stretches a human body part below the waistline position in the current video frame.

The stretching may be performed according to a golden ratio (that is, a ratio of a leg length to a body length is 0.618), or may be performed according to a preference of a user or setting. For example, the part below the waistline position may be stretched to 1.2 times or 1.5 times of the original length.

If there are a plurality of human bodies in the current video frame, there are necessarily a plurality of waistline positions. In this case, when stretching is performed, the network device may select a waistline position as a target waistline position for stretching. For example, a highest waistline position may be selected from the plurality of waistline positions of the current video frame as the target waistline position. Then, the human body part below the target waistline position in the current video frame is stretched. A specific stretch level may be determined according to a requirement of actual application. For example, an average value of stretch levels of the plurality of human bodies may be obtained for stretching. Details may be as follows:

An optimum stretch level of each human body is determined according to a golden ratio of a leg length to a body length of each human body in the current video frame. Then, an average value of the stretch levels of all the human bodies in the current video frame is calculated, and the human body part below the target waistline position in the current video frame is stretched according to the average value.

After the stretching, there is an obvious slope jump on the stretch boundary (that is, the waistline position). Consequently, the background appears to be unnatural, and an image display effect is affected. For example, if the waistline position is "y=0.5", stretching is to be performed from the line "y=0.5". If the stretch level is 20%, a slope change of pixels in the current video frame may be as shown in FIG. 2c. As can be seen from FIG. 2c, there is an obvious slope jump at y=0.5. Therefore, after the stretching, smoothing processing may further be performed on the slope of the part, to eliminate the "jump". That is, step 210 may further be performed in the video data processing method.

In this embodiment of this application, there may be a plurality of manners of stretching the human body part below the waistline position (or the target waistline position). For example, details may be as follows:

The network device stretches a human body image zone below the waistline position (or the target waistline position) in the video frame.

For example, specifically, the human body image zone may be extracted from the video frame as a foreground part according to the detected human body key points, and a remaining part obtained after the human body image zone is extracted is used as a background part. Then, an image zone below the waistline position in the foreground part is stretched, and the stretched foreground part and the background part are superimposed, to obtain the stretched current video frame.

To simplify an operation and improve processing efficiency, the foreground and the background may not be divided. Instead, overall stretching is performed on an entire image zone below the waistline position (or the target waistline position) in the video frame, and details are not described herein again.

210: The network device performs smoothing processing on the slope of the waistline position part in the stretched current video frame, to obtain a result frame, and then performs step 211.

A policy of the smoothing processing may be determined according to a requirement of actual application. For example, a transition zone may be disposed at the waistline position part. Then, the slope in the transition zone is decreased, to make the stretch border smoother and softer.

The example in FIG. 2c is still used as an example. There is an obvious slope jump at y=0.5, and therefore, a transition zone may be disposed at y=0.5. For example, a 20% transition zone is disposed. Then, the slope in the transition zone is smoothed from 1.0 to 0.8. It can be seen from FIG. 2d that the stretch border obtained after smoothing processing is performed appears to be smoother and softer compared with the stretch border in FIG. 2c.

Certainly, specific setting of the transition zone and the amplitude of slope decrease may be flexibly set according to a requirement of actual application. The foregoing example is merely exemplary and is not used as a limitation.

211: The network device outputs the result frame.

For example, the network device may display the result frame in an interface of the terminal. For example, referring to the right figure in FIG. 2f, the video frame obtained after the legs are stretched may be displayed, so that the function of real-time leg-lengthening is implemented when a video is recorded.

As shown in FIG. 2f, the user may flexibly adjust the stretch level of the legs of the human body in the current video frame by adjusting the "slider" 283 in the interface.

In some embodiments, the user may further view a comparison effect before and after stretching by presetting a trigger key, for example, by pressing a video image. For example, as shown in FIG. 2e, the figure is a comparison diagram of a current video frame before stretching and after stretching. The left figure is the current video frame before stretching, and the right figure is the stretched current video frame. In can be seen that after the human body part below the waistline position is stretched, the leg length of the human body in the right figure is apparently greater than the leg length of the human body in the left figure.

After step 210 is performed, the step of acquiring a current video frame (that is, step 201) may be performed again, to stretch the next video frame until video capture ends. In this way, the human body in the video can be stretched in real time, for example, the function of performing leg-lengthening on the human body in the video can be implemented.

It can be learned from the foregoing that in this embodiment, after the current video frame is acquired, the position of the human body key point in the current video frame may be detected, to obtain the point position set of the human body in the current video frame. Then the point position set of the human body in the historical video frame is obtained. Smoothing processing is performed on the point position set of the human body in the current video frame according to the point position set of the human body in the historical video frame, and the jitter amplitude of the human body key point in the current video frame is analyzed according to the smoothed point position set of the human body in the current video frame and the point position set of the human body in the historical video frame. The preset fixed waistline value is used as the waistline position of the current video frame in a case that it is determined that the current video frame is in the steady state according to the jitter amplitude; conversely, the waistline position of the current video frame is calculated according to the point position set of the human body in the current video frame in a case that the current video frame is in the unsteady state. Subsequently, the human body part below the waistline position in the current video frame may be stretched, and the stretched current video frame is outputted, thereby performing real-time leg-lengthening on the human body in the current frame. In this solution, only the part below the waistline is stretched. In addition, a fixed waistline is used for a video frame having a small jitter amplitude, and a flexible waistline is used for a video frame having a relatively large jitter amplitude. Therefore, real-time leg-lengthening may be performed on the human body in the video frame, to improve a leg-lengthening effect; meanwhile, natural and smooth background deformation in the video frame is ensured to a large extent, thereby greatly improving the robustness and adaptability of the real-time leg-lengthening function and helping to improve the display effect of the video image.

Moreover, in this solution, after the point position set of the human body in the current video frame is obtained, smoothing processing may further be performed on the point position set, so that the problem of a relatively large difference between point positions of two adjacent frames that is caused by violent movement of the human body can be greatly reduced, and a processing effect of the video image can be further improved.

An embodiment of this application may further provide a video data processing apparatus. The video data processing apparatus may be specifically integrated into a network device. The network device may be a device such as a terminal or a server.

Figure 3A:
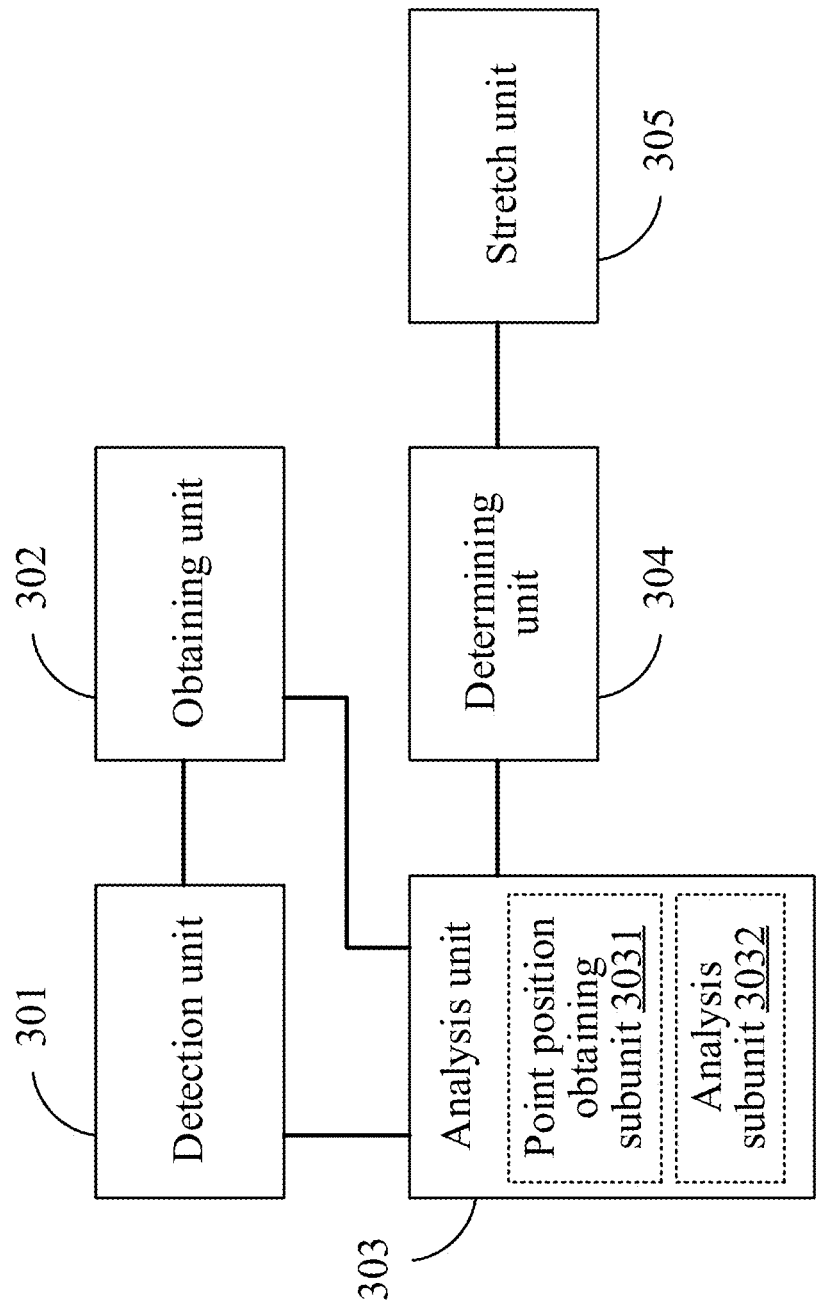
FIG. 3a is a schematic structural diagram of a video data processing apparatus according to some embodiments of this application.

For example, as shown in FIG. 3a, the video data processing apparatus may include a detection unit 301, an obtaining unit 302, an analysis unit 303, a determining unit 304, and a stretch unit 305. Details are as follows:

The detection unit 301 is configured to acquire a current video frame, and detect a position of a human body key point in the current video frame, to obtain a point position set of a human body in the current video frame.

For example, the detection unit 301 may be specifically configured to detect the position of the human body key point in the current video frame by using a posture estimation model, to obtain the point position set of the human body in the current video frame.

The posture estimation model may be pre-established according to a requirement of actual application, may be provided for the video data processing apparatus after being established by another device, or may be established by the video data processing apparatus. That is, the video data processing apparatus may further include an establishment unit, specifically configured to acquire a plurality of image samples marked with human body key points. Then, a preset initial posture estimation model is trained by using the image samples, to obtain the posture estimation model. For details of the training manner, refer to the foregoing method embodiments, and details are not described herein again.

The human body key point is a feature point that can identify a key part of the human body, and may be specifically determined according to a requirement of actual application. For example, the human body key points may specifically include the 22 human body key points shown in Table 1. For details, refer to the foregoing embodiments, and details are not described herein again.

Due to the change of the human body posture, some human body key points in the point position set of the human body in the current video frame may be lost. If some key points are lost (that is, the key points are invalid), the previous valid human body key point may still be used.

Figure 3B:
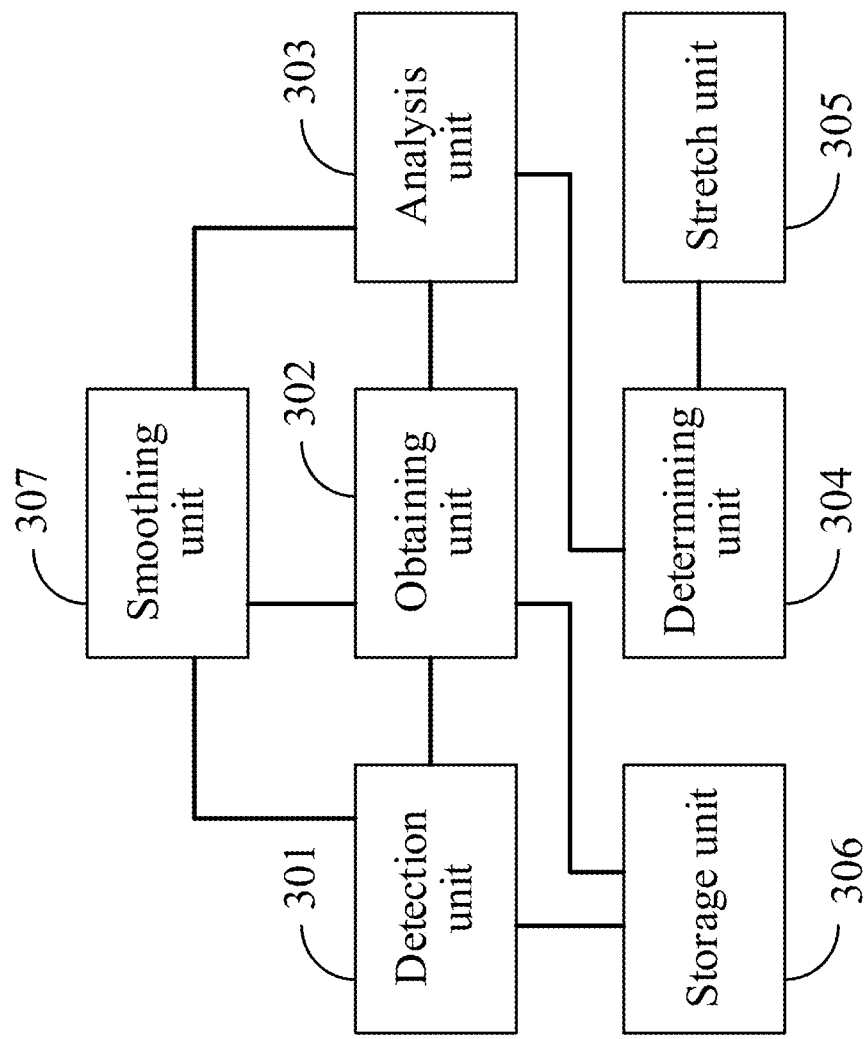
FIG. 3b is another schematic structural diagram of a video data processing apparatus according to some embodiments of this application.

After the point position set of the human body in the current video frame is obtained, the point position set of the human body in the current video frame may further be stored. In this way, the stored point position set may be directly read if the point position set of the human body in the current video frame needs to be obtained subsequently (the current video frame may be used as the historical video frame of a subsequent video frame). That is, as shown in FIG. 3b, the video data processing apparatus may further include a storage unit 306, and details may be as follows:

The storage unit 306 is configured to store the point position set of the human body in the current video frame.

The obtaining unit 302 is configured to obtain a point position set of the human body in a historical video frame. The historical video frame is a video frame within a preset time range before the current video frame in the video stream.

There may be a plurality of manners of obtaining the point position set of the human body in the historical video frame. For example:

The obtaining unit 302 may be specifically configured to obtain a video frame within the preset time range before the current video frame to obtain the historical video frame, and then detect a position of the human body key point in the historical video frame, to obtain the point position set of the human body in the historical video frame.

In another example, if the point position set of the human body in the historical video frame is already stored heretofore, the point position set of the human body in the historical video frame can be directly read. That is:

The obtaining unit 302 may be specifically configured to obtain a video frame within a preset time range before the current video frame to obtain the historical video frame, and determine whether the point position set of the human body in the historical video frame is stored; and if yes, read the point position set of the human body in the historical video frame; or if not, detect a position of the human body key point in the historical video frame, to obtain the point position set of the human body in the historical video frame.

The analysis unit 303 is configured to analyze a jitter amplitude of the human body key point in the current video frame according to the point position set of the human body in the current video frame and the point position set of the human body in the historical video frame.

For example, the analysis unit 303 may include a point position obtaining subunit 3031 and an analysis subunit 3032. Details may be as follows:

The point position obtaining subunit 3031 is configured to obtain a point position of a crotch of the human body in the current video frame from the point position set of the human body in the current video frame, and obtain a point position of the crotch of the human body in the historical video frame from the point position set of the human body in the historical video frame.

The analysis subunit 3032 is configured to analyze the jitter amplitude of the human body key point in the current video frame according to the point position of the crotch of the human body in the current video frame and the point position of the crotch of the human body in the historical video frame.

For example, the analysis subunit 3032 may be specifically configured to calculate a waistline of the human body in the current video frame according to the point position of the crotch of the human body in the current video frame, calculate a waistline of the human body in the historical video frame according to the point position of the crotch of the human body in the historical video frame, and calculate a distance between the waistline of the human body in the current video frame and the waistline of the human body in the historical video frame, to obtain the jitter amplitude of the human body key point in the current video frame.

For example, the analysis subunit 3032 may be specifically configured to calculate an average value of a "right crotch" point and a "left crotch" point in the current video frame, to obtain the waistline of the human body in the current video frame, calculate an average value of a "right crotch" point and a "left crotch" point in the historical video frame, to obtain the waistline of the human body in the historical video frame, and then calculate the distance between the waistline of the human body in the current video frame and the waistline of the human body in the historical video frame, to obtain the jitter amplitude of the human body key point in the current video frame.

The determining unit 304 is configured to determine a waistline position of the human body in the current video frame according to the jitter amplitude.

For example, the determining unit 304 may be specifically configured to use a preset waistline value as the waistline position of the current video frame in a case that it is determined that the current video frame is in a steady state according to the jitter amplitude, or calculate the waistline position of the current video frame according to the point position set of the human body in the current video frame in a case that it is determined that the current video frame is in an unsteady state according to the jitter amplitude.

For example, the determining unit 304 may be specifically configured to use the preset waistline value as the waistline position of the current video frame in a case that it is determined that the jitter amplitude is less than a preset threshold, or calculate the waistline position of the current video frame according to the point position set of the human body in the current video frame in a case that it is determined that the jitter amplitude is greater than or equal to the preset threshold.

For example, the determining unit 304 may be specifically configured to obtain, in a case that it is determined that the current video frame is in the unsteady state according to the jitter amplitude (for example, in a case that it is determined that the jitter amplitude is greater than or equal to the preset threshold), a point position of the crotch of the human body in the current video frame from the point position set of the human body in the current video frame, calculate the waistline of the human body in the current video frame according to the point position of the crotch of the human body in the current video frame, and determine the waistline position of the current video frame according to the waistline obtained through calculation.

The preset threshold may be set according to a requirement of actual application. For example, it may be set that waistlines of two adjacent frames float within 10% in the steady state and float beyond 10% in the unsteady state. Certainly, it may alternatively be set that it is determined that the current video frame is in the steady state if waistlines of consecutive X1 frames float within a specific amplitude such as 10%, and it is determined that the current video frame is in the unsteady state if waistlines of consecutive X2 frames float beyond a specific amplitude such as 10%, and the like. X1 and X2 may also be set according to a requirement of actual application. For example, X1 may be 60, and X2 may be 100. Details are not described herein.

The stretch unit 305 is configured to stretch a human body part below the waistline position in the current video frame, and output the stretched current video frame.

For example, the stretch unit 305 may be specifically configured to stretch the part below the waistline position in the current video frame according to a golden ratio (that is, a ratio of a leg length to a body length is 0.618), to obtain a result frame, and output the result frame.

After the stretching, there is an obvious slope jump on the stretch boundary (that is, the waistline position). Consequently, the background appears to be unnatural, and an image display effect is affected. Therefore, after the stretching, smoothing processing may further be performed on the slope of the part, to eliminate the "jump". That is:

The stretch unit 305 may be specifically configured to stretch the human body part below the waistline position in the current video frame according to a golden ratio, perform smoothing processing on the slope of the waistline position part in the stretched current video frame, to obtain a result frame, and output the result frame.

A policy of the smoothing processing may be determined according to a requirement of actual application. For example, a transition zone may be disposed at the waistline position part. For example, a 20% transition zone is disposed. Then, the slope in the transition zone is decreased, to make the stretch border smoother and softer.

If there are a plurality of human bodies in the current video frame, there are necessarily a plurality of waistline positions. In this case, when stretching is performed, one waistline position may be selected from the plurality of waistline positions as a target waistline position for stretching. For example, a highest waistline position may be selected as the target waistline position. That is:

The stretch unit 305 may be specifically configured to select a highest waistline position from the plurality of waistline positions of the current video frame as a target waistline position, stretch the human body part below the target waistline position in the current video frame, and output the stretched current video frame.

For example, the stretch unit 305 may be specifically configured to stretch the part below the target waistline position in the current video frame according to a golden ratio, perform smoothing processing on the slope of the target waistline position part in the stretched current video frame, to obtain a result frame, and output the result frame.

Subsequently, the stretch unit 305 may return to trigger the detection unit 301 to perform the step of acquiring a current video frame, to stretch the next video frame until video capture ends. In this way, the human body in the video can be stretched in real time, for example, the function of performing leg-lengthening on the human body in the video can be implemented.

When the human body moves violently (such as dancing), there may be a relatively large difference between point positions of two adjacent frames, and this may cause intense jitter of the point position. Therefore, to avoid the problem and improve a processing effect, before the jitter amplitude of the human body key point is analyzed, smoothing processing may further be performed on the point positions. That is, as shown in FIG. 3b, the video data processing apparatus may further include a smoothing unit 307.

The smoothing unit 307 is configured to perform smoothing processing on the point position set of the human body in the current video frame according to the point position set of the human body in the historical video frame by using a preset point-position smoothing algorithm, to obtain the smoothed point position set of the human body in the current video frame.

In this case, the analysis unit is specifically configured to analyze the jitter amplitude of the human body key point in the current video frame according to the smoothed point position set of the human body in the current video frame and the point position set of the human body in the historical video frame.

For example, the smoothing unit 307 may be specifically configured to perform, in a time dimension, the smoothing processing on the point position set of the human body in the current video frame according to the point position set of the human body in the historical video frame, to obtain a time smoothing result; perform, in a space dimension, the smoothing processing on the point position set of the human body in the current video frame according to the point position set of the human body in the historical video frame, to obtain a space smoothing result; perform, in a confidence dimension, the smoothing processing on the point position set of the human body in the current video frame according to the point position set of the human body in the historical video frame, to obtain a confidence smoothing result; and perform a weighted operation on the time smoothing result, the space smoothing result, and the confidence smoothing result, to obtain the smoothed point position set of the human body in the current video frame. For details, refer to the foregoing method embodiments, and details are not described herein again.

In a specific implementation, the foregoing units may be implemented as independent entities, or may be randomly combined, or may be implemented as the same entity or several entities. For specific implementations of the foregoing units, refer to the foregoing method embodiments. Details are not described herein again.

It can be learned from the foregoing that in the video data processing apparatus in this embodiment, after the current video frame is acquired, the detection unit 301 may detect the position of the human body key point in the current video frame, to obtain the point position set of the human body in the current video frame. Then the obtaining unit 302 obtains the point position set of the human body in the historical video frame. The analysis unit 303 analyzes the jitter amplitude of the human body key point in the current video frame according to the point position set of the human body in the current video frame and the point position set of the human body in the historical video frame. The determining unit 304 determines the waistline position of the human body in the current video frame according to the jitter amplitude. For example, the determining unit 304 uses the preset fixed waistline value as the waistline position of the current video frame in a case that it is determined that the current video frame is in the steady state according to the jitter amplitude; conversely, the determining unit 304 calculates the waistline position of the current video frame according to the point position set of the human body in the current video frame in a case that the current video frame is in the unsteady state. Subsequently, the stretch unit 305 stretches the human body part below the waistline position in the current video frame and outputs the stretched current video frame, thereby performing real-time leg-lengthening on the human body in the current frame. In this solution, only the part below the waistline is stretched. In addition, a fixed waistline is used for a video frame having a small jitter amplitude, and a flexible waistline is used for a video frame having a relatively large jitter amplitude. Therefore, real-time leg-lengthening may be performed on the human body in the video frame, to improve a leg-lengthening effect; meanwhile, natural and smooth background deformation in the video frame is ensured to a large extent, thereby greatly improving the robustness and adaptability of the real-time leg-lengthening function and helping to improve the display effect of the video image.

An embodiment of this application further provides a network device, which may be specifically a terminal or a server. The network device may integrate any video data processing apparatus provided in the embodiments of this application.

Figure 4:
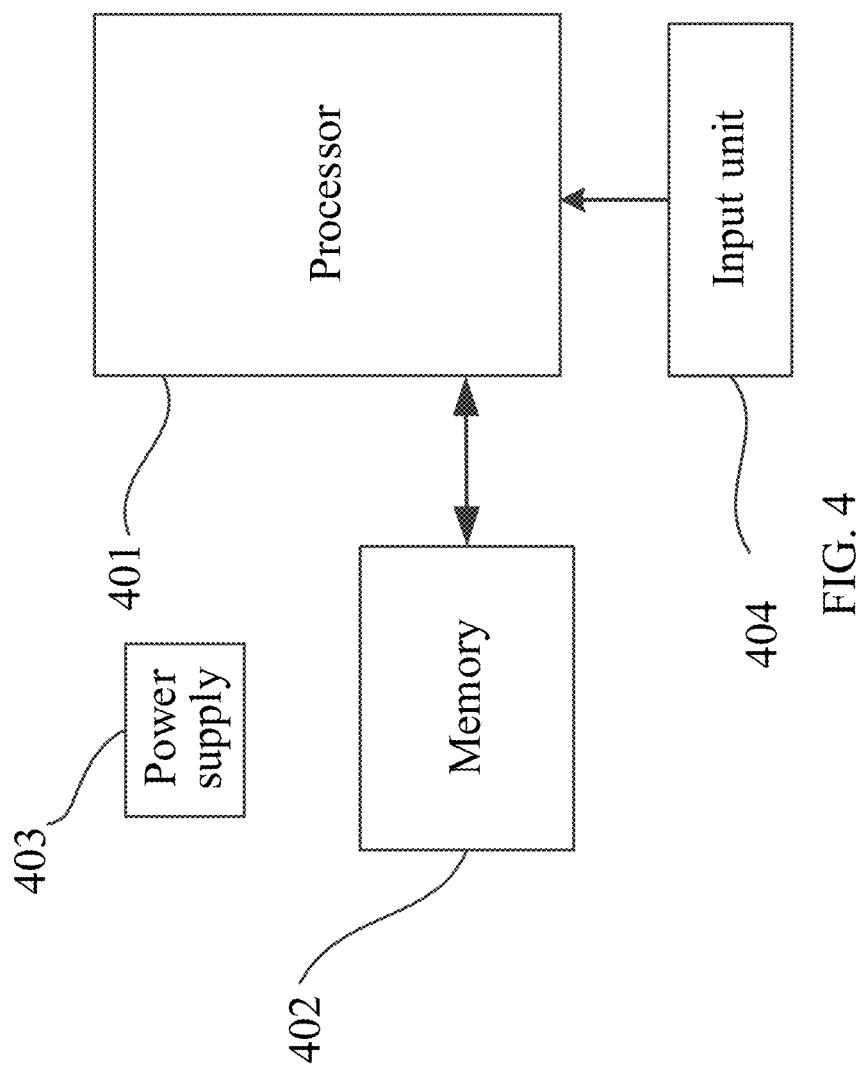
FIG. 4 is a schematic structural diagram of a network device according to some embodiments of this application.

For example, FIG. 4 is a schematic structural diagram of a network device according to an embodiment of this application. Specifically:

The network device may include components such as a processor 401 including one or more processing cores, a memory 402 including one or more computer-readable storage media, a power supply 403, and an input unit 404. A person skilled in the art may understand that the structure of the network device shown in FIG. 4 does not constitute a limitation to the network device, and the network device may include more or fewer components than those shown in the figure, or some components may be combined, or a different component deployment may be used.

The processor 401 is a control center of the network device, and connects various parts of the entire network device by using various interfaces and lines. By running or executing software programs and/or modules stored in the memory 402, and invoking data stored in the memory 402, the processor 401 performs various functions and data processing of the network device, thereby performing overall monitoring on the network device. The processor 401 may include one or more processing cores. The processor 401 may integrate an application processor and a modem processor. The application processor mainly processes an operating system, a user interface, an application program, and the like. The modem processor mainly processes wireless communication. It may be understood that the foregoing modem processor may alternatively not be integrated into the processor 401.

The memory 402 may be configured to store a software program and module. The processor 401 runs the software program and module stored in the memory 402, to implement various functional applications and data processing. The memory 402 may mainly include a program storage area and a data storage area. The program storage area may store an operating system, an application program required by at least one function (such as a sound playing function and an image display function), and the like. The data storage area may store data created according to use of the network device, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The network device further includes the power supply 403 for supplying power to the components. The power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other component.

The network device may further include the input unit 404. The input unit 404 may be configured to receive input digit or character information and generate keyboard, mouse, joystick, optical, or trackball signal input related to user settings and function control.

Although not shown in the figure, the network device may further include a display unit, and the like. Details are not described herein again. Specifically, in this embodiment, the processor 401 in the network device may load, according to the following instructions, executable files corresponding to processes of one or more application programs into the memory 402. The processor 401 runs the application programs stored in the memory 402, to implement any data processing method in the embodiments of this application.

A person of ordinary skill in the art may understand that all or some of the steps in the methods in the foregoing embodiments may be implemented by using instructions, or implemented by instructions controlling relevant hardware. The instructions may be stored in a non-transitory computer-readable storage medium and loaded and executed by a processor.

Accordingly, an embodiment of this application provides a non-transitory computer-readable storage medium, storing a plurality of instructions, the instructions being operable to be loaded by a processor, to perform the steps in any video data processing method according to the embodiments of this application.

The storage medium may include: a read-only memory (ROM), a random access memory (RAM), a magnetic disk, an optical disc, or the like.

The video data processing method and apparatus, and the storage medium that are provided in the embodiments of this application are described in detail above. The principle and implementation of this application are described herein by using specific examples. The descriptions of the foregoing embodiments are merely intended to help understand the method and the core idea of this application. In addition, a person skilled in the art can make variations and modifications in terms of the specific implementations and application scopes according to the ideas of this application. Therefore, the content of this specification shall not be construed as a limitation to this application.

The foregoing descriptions are merely preferred embodiments of this application, but are not intended to limit this application. Any modification, equivalent replacement, or improvement made within the principle of this application shall fall within the protection scope of this application.

What is claimed is:

1. A video data processing method, performed by a computing device having a processor and memory storing a plurality of computer programs to be executed by the processor, the method comprising:
    acquiring a current video frame and a historical video frame from a video stream, the historical video frame being a video frame within a preset time range before the current video frame in the video stream;
    obtaining a point position set of a human body in the current video frame;
    obtaining a point position set of the human body in the historical video frame;
    obtaining a smoothed point position set of the human body in the current video frame by performing smoothing processing on the point position set of the human body in the current video frame according to the point position set of the human body in the historical video frame by using a preset point-position smoothing algorithm, including:
        performing, in a time dimension, the smoothing processing on the point position set of the human body in the current video frame according to the point position set of the human body in the historical video frame, to obtain a time smoothing result;
        performing, in a space dimension, the smoothing processing on the point position set of the human body in the current video frame according to the point position set of the human body in the historical video frame, to obtain a space smoothing result; and
        generating the smoothed point position set of the human body based on the time smoothing result and the space smoothing result;
    analyzing a jitter amplitude of a human body key point in the current video frame according to the smoothed point position set of the human body in the current video frame and the point position set of the human body in the historical video frame;
    determining an adjustment reference position of the human body in the current video frame according to the jitter amplitude; and
    adjusting a human body part below the adjustment reference position in the current video frame and outputting the adjusted current video frame.

2. The method according to claim 1, wherein the determining an adjustment reference position of the human body in the current video frame according to the jitter amplitude comprises:
    determining the adjustment reference position of the human body in the current video frame by using a preset fixed value in a case that it is determined that the current video frame is in a steady state according to the jitter amplitude; and
    calculating the adjustment reference position of the human body in the current video frame according to the point position set of the human body in the current video frame in a case that it is determined that the current video frame is in an unsteady state according to the jitter amplitude.

3. The method according to claim 2, further comprising:
    determining whether the jitter amplitude is less than a preset threshold;
    determining that the current video frame is in the steady state in a case that the jitter amplitude is less than the preset threshold; and
    determining that the current video frame is in the unsteady state in a case that the jitter amplitude is not less than the preset threshold.

4. The method according to claim 2, wherein the adjustment reference position is a waistline position, and the calculating the adjustment reference position of the current video frame according to the point position set of the human body in the current video frame comprises:
    obtaining a point position of a crotch of the human body in the current video frame from the point position set of the human body in the current video frame;
    calculating a waistline of the human body in the current video frame according to the point position of the crotch of the human body in the current video frame; and
    determining the waistline position of the current video frame according to the waistline obtained through calculation.

5. The method according to claim 1, wherein the human body key point in the current video frame is detected by using a posture estimation model, to obtain the point position set of the human body in the current video frame.

6. The method according to claim 1, wherein after the obtaining a point position set of a human body in the current video frame, the method further comprises:
   storing the point position set of the human body in the current video frame.

7. The method according to claim 6, wherein the obtaining a point position set of the human body in the historical video frame comprises:
   obtaining a video frame within the preset time range before the current video frame, to obtain the historical video frame;
   determining whether the point position set of the human body in the historical video frame is stored;
   reading the point position set of the human body in the historical video frame in a case that the point position set of the human body in the historical video frame is stored; and
   detecting a position of the human body key point in the historical video frame, to obtain the point position set of the human body in the historical video frame in a case that the point position set of the human body in the historical video frame is not stored.

8. The method according to claim 1, wherein the analyzing a jitter amplitude of a human body key point in the current video frame according to the smoothed point position set of the human body in the current video frame and the point position set of the human body in the historical video frame comprises:
   obtaining a smoothed point position of a crotch of the human body in the current video frame from the smoothed point position set of the human body in the current video frame;
   obtaining a point position of the crotch of the human body in the historical video frame from the point position set of the human body in the historical video frame; and
   analyzing the jitter amplitude of the human body key point in the current video frame according to the smoothed point position of the crotch of the human body in the current video frame and the point position of the crotch of the human body in the historical video frame.

9. The method according to claim 8, wherein the analyzing the jitter amplitude of a human body key point in the current video frame according to the smoothed point position of the crotch of the human body in the current video frame and the point position of the crotch of the human body in the historical video frame comprises:
   calculating the waistline of the human body in the current video frame according to the smoothed point position of the crotch of the human body in the current video frame;
   calculating a waistline of the human body in the historical video frame according to the point position of the crotch of the human body in the historical video frame; and
   calculating a distance between the waistline of the human body in the current video frame and the waistline of the human body in the historical video frame, to obtain the jitter amplitude of the human body key point in the current video frame.

10. The method according to claim 1, wherein obtaining the smoothed point position set of the human body in the current video frame further comprises:
    performing, in a confidence dimension, the smoothing processing on the point position set of the human body in the current video frame according to the point position set of the human body in the historical video frame, to obtain a confidence smoothing result; and
    performing a weighted operation on the time smoothing result, the space smoothing result, and the confidence smoothing result, to obtain the smoothed point position set of the human body in the current video frame.

11. The method according to claim 1, wherein the adjustment reference position is the waistline position, the current frame comprises a plurality of waistline positions, and the adjusting a human body part below the adjustment reference position in the current video frame and outputting the adjusted current video frame comprises:
    selecting a highest waistline position from the plurality of waistline positions of the current video frame as a target waistline position; and
    stretching the human body part below the target waistline position in the current video frame, and outputting the stretched current video frame.

12. The method according to claim 11, wherein the stretching the human body part below the target waistline position in the current video frame, and outputting the stretched current video frame comprises:
    stretching the human body part below the target waistline position in the current video frame according to a golden ratio;
    performing smoothing processing on a slope of the target waistline position part in the stretched current video frame, to obtain a result frame; and
    outputting the result frame.

13. A computing device, comprising:
    a processor; and
    memory connected to the processor, the memory storing a plurality of computer programs that, when executed by the processor, cause the computing device to perform a plurality of operations including:
    acquiring a current video frame and a historical video frame from a video stream, the historical video frame being a video frame within a preset time range before the current video frame in the video stream;
    obtaining a point position set of a human body in the current video frame;
    obtaining a point position set of the human body in the historical video frame;
    obtaining a smoothed point position set of the human body in the current video frame by performing smoothing processing on the point position set of the human body in the current video frame according to the point position set of the human body in the historical video frame by using a preset point-position smoothing algorithm, including:
       performing, in a time dimension, the smoothing processing on the point position set of the human body in the current video frame according to the point position set of the human body in the historical video frame, to obtain a time smoothing result;
    performing, in a space dimension, the smoothing processing on the point position set of the human body in the current video frame according to the point position set of the human body in the historical video frame, to obtain a space smoothing result; and
    generating the smoothed point position set of the human body based on the time smoothing result and the space smoothing result;

analyzing a jitter amplitude of a human body key point in the current video frame according to the smoothed point position set of the human body in the current video frame and the point position set of the human body in the historical video frame;

determining an adjustment reference position of the human body in the current video frame according to the jitter amplitude; and adjusting a human body part below the adjustment reference position in the current video frame and outputting the adjusted current video frame.

14. The computing device according to claim 13, wherein the determining an adjustment reference position of the human body in the current video frame according to the jitter amplitude comprises:

determining the adjustment reference position of the human body in the current video frame by using a preset fixed value in a case that it is determined that the current video frame is in a steady state according to the jitter amplitude; and calculating the adjustment reference position of the human body in the current video frame according to the point position set of the human body in the current video frame in a case that it is determined that the current video frame is in an unsteady state according to the jitter amplitude.

15. The computing device according to claim 13, wherein the analyzing a jitter amplitude of a human body key point in the current video frame according to the smoothed point position set of the human body in the current video frame and the point position set of the human body in the historical video frame comprises:

obtaining a smoothed point position of a crotch of the human body in the current video frame from the smoothed point position set of the human body in the current video frame;

obtaining a point position of the crotch of the human body in the historical video frame from the point position set of the human body in the historical video frame; and analyzing the jitter amplitude of the human body key point in the current video frame according to the smoothed point position of the crotch of the human body in the current video frame and the point position of the crotch of the human body in the historical video frame.

16. The computing device according to claim 13, wherein the adjustment reference position is the waistline position, the current frame comprises a plurality of waistline positions, and the adjusting a human body part below the adjustment reference position in the current video frame and outputting the adjusted current video frame comprises:

selecting a highest waistline position from the plurality of waistline positions of the current video frame as a target waistline position; and stretching the human body part below the target waistline position in the current video frame, and outputting the stretched current video frame.

17. The computing device according to claim 16, wherein the stretching the human body part below the target waistline position in the current video frame, and outputting the stretched current video frame comprises:

stretching the human body part below the target waistline position in the current video frame according to a golden ratio;

performing smoothing processing on a slope of the target waistline position part in the stretched current video frame, to obtain a result frame; and outputting the result frame.

18. A non-transitory computer-readable storage medium, storing a plurality of computer programs that, when executed by a processor of a computing device, cause the computing device to perform a plurality of operations including:

acquiring a current video frame and a historical video frame from a video stream, the historical video frame being a video frame within a preset time range before the current video frame in the video stream;

obtaining a point position set of a human body in the current video frame;

obtaining a point position set of the human body in the historical video frame;

obtaining a smoothed point position set of the human body in the current video frame by performing smoothing processing on the point position set of the human body in the current video frame according to the point position set of the human body in the historical video frame by using a preset point-position smoothing algorithm, including:

performing, in a time dimension, the smoothing processing on the point position set of the human body in the current video frame according to the point position set of the human body in the historical video frame, to obtain a time smoothing result;

performing, in a space dimension, the smoothing processing on the point position set of the human body in the current video frame according to the point position set of the human body in the historical video frame, to obtain a space smoothing result; and generating the smoothed point position set of the human body based on the time smoothing result and the space smoothing result;

analyzing a jitter amplitude of a human body key point in the current video frame according to the smoothed point position set of the human body in the current video frame and the point position set of the human body in the historical video frame;

determining an adjustment reference position of the human body in the current video frame according to the jitter amplitude; and adjusting a human body part below the adjustment reference position in the current video frame and outputting the adjusted current video frame.

19. The method according to claim 1, wherein performing, in the time dimension, the smoothing processing on the point position set of the human body in the current video frame comprises:

obtaining a time vector of the point position set of the human body in a plurality of historical video frames; and applying a weighted sum operation to the time vector.

20. The method according to claim 1, wherein performing, in the space dimension, the smoothing processing on the point position set of the human body in the current video frame comprises applying a non-linear offset function to a difference in the point position set of the human body in the current video frame and the point position set of the human body in the historical video frame.

* * * * *